(12) United States Patent
Komatsu

(10) Patent No.: US 6,424,114 B1
(45) Date of Patent: Jul. 23, 2002

(54) SYNCHRONOUS MOTOR

(76) Inventor: Fumito Komatsu, 1632-12, Nomura, Hirooka, Shiojiri-shi, Nagano 399-0702 (JP)

( * ) Notice: Subject to any disclaimer, the term of this patent is extended or adjusted under 35 U.S.C. 154(b) by 0 days.

(21) Appl. No.: 09/787,754

(22) PCT Filed: May 14, 1999

(86) PCT No.: PCT/JP99/02541

§ 371 (c)(1), (2), (4) Date: Mar. 21, 2001

(87) PCT Pub. No.: WO00/19593

PCT Pub. Date: Apr. 6, 2000

(30) Foreign Application Priority Data

Sep. 25, 1998 (JP) .......................... 10-271823
Sep. 25, 1998 (JP) .......................... 10-271829

(51) Int. Cl.[7] ............................... H02K 21/00
(52) U.S. Cl. ...................... 318/721; 318/720; 318/700; 310/68 R
(58) Field of Search .................... 318/105, 107, 318/700, 720, 721, 724; 310/68 B, 68 R

(56) References Cited

U.S. PATENT DOCUMENTS 5,914,582 A * 6/1999 Takamoto et al. .......... 318/700

FOREIGN PATENT DOCUMENTS

| JP | 55-56495 | 4/1980 |
| JP | 58-170346 | 10/1983 |
| JP | 59-188383 | 10/1984 |
| JP | 9-84316 | 3/1997 |
| JP | 9-135559 | 5/1997 |

* cited by examiner

*Primary Examiner*—Burton S. Mullins
(74) *Attorney, Agent, or Firm*—Jordan and Hamburg LLP

(57) ABSTRACT

A small synchronous motor with high reliability so devised that transition from start operation to synchronous operation is ensured. A microcomputer 22 switching-controls the current application range to a range where the rectified current flowing through a rectifying bridge circuit 20 and an A-coil alternately is inverted during one turn of a permanent magnet rotor 5 to suppress the input on the inverted side with respect to the non-inverted side and thereby to start a synchronous motor, turns off first to fourth transistors 16–19 when the rotational speed of the permanent magnet rotor regulated by the power source frequency and measured by a power source frequency measuring section 24, and turns on triacs SW1 and SW2, thereby making a switch to the synchronous operation circuit 21.

14 Claims, 13 Drawing Sheets

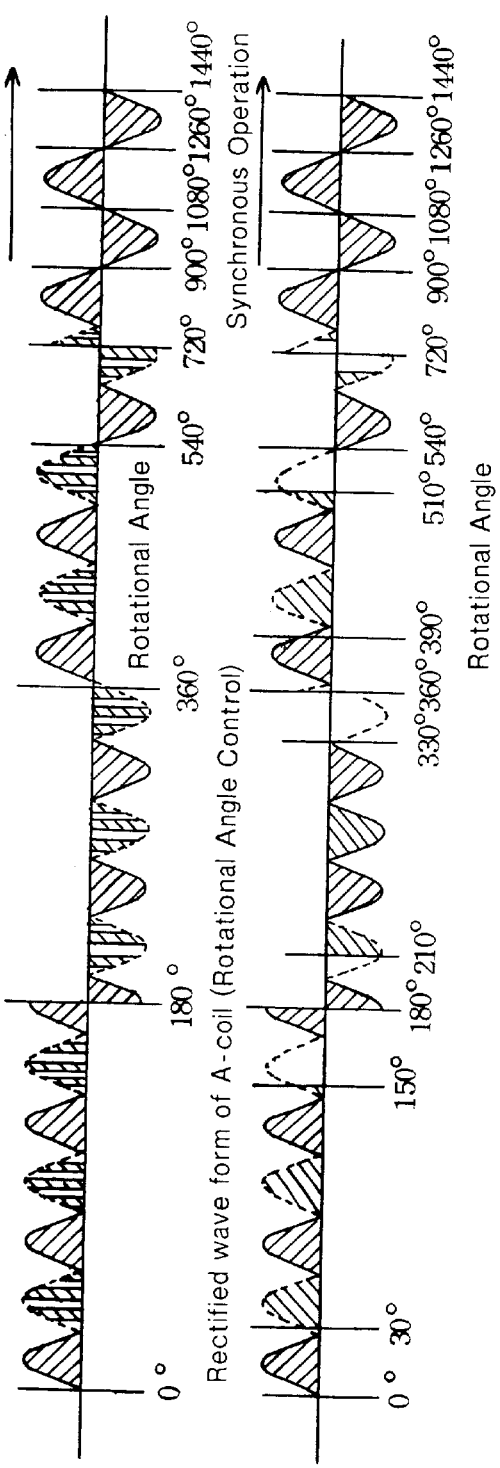

2 Poles - 360 DEG.- 26 Divided

2 Poles - 360 DEG.- 52 Divided

SYNCHRONOUS MOTOR

FIELD OF TECHNOLOGY

The present invention relates to a synchronous motor.

BACKGROUND TECHNOLOGY

These days, office automation equipments, for example, have DC or AC fan motors for cooling. Especially, in the case of high rotational speed, AC fan motors having two or four magnetic poles are preferably employed.

The inventor invented synchronous motors (see JP7-232268, JP8106929, etc.), each of which has armature coils and a rectifying circuit, which includes a diode, a brush, a commutator, etc. and is connected to the coils; and each of the motors rectifies AC current, which is supplied from an AC power source, and starts to rotate a permanent magnet rotor, as a DC motor, until its rotational speed reaches near synchronous speed, then the commutator is mechanically disconnected from the rectifying circuit so as to transfer to synchronous operation with the AC power source.

A two-magnetic pole synchronous motor has rotational speed of 3,000 rpm (50 Hz) or 3,600 rpm (60 Hz), small size, high working efficiency and applicability, so it is preferably used as an AC fan motor, etc.

An example of an outer rotor-type two-magnetic pole synchronous motor is shown in FIGS. 17 and 18. A commutator 101 is capable of moving in an axial direction of an output shaft 102 so as to mechanically changing operational state from a start operation to a synchronous operation. A ring-shaped permanent magnet rotor (not shown), in which two magnetic poles are provided with angular separation of 180°, is coaxial to the commutator 101 and attached to the output shaft 102. The permanent magnet rotor is started by magnetic repulsion, which is occurred when electric current flows through armature coils 103. An electric conductive slide ring 104, whose central angle is less than 180°, is provided to an outer circumferential face of the commutator 101.

When the rotational speed of the permanent magnet rotor reaches near synchronous speed, the commutator 102 is moved in the axial direction, by centrifugal force of a weight not shown, against elastic force of a coil spring (not shown). With this action, a switch 107 electrically disconnects a rectifying circuit 106 from a single-phase AC power source 105 and electrically connects the coils 103 to the power source 105.

The coils 3 are two coil segments: an A-coil and a B-coil. The A-coil and the B-coil are formed by winding a wire round a bobbin, not shown, in a prescribed direction with prescribed turns. Power supply brushes 108a and 108b contact the slide ring 104, which is provided on the outer circumferential face of the commutator 101, so as to alternately supply electric power, so their phases are mutually shifted 180°. A-power receiving brushes 109a and 109b are used to supply the electric power to the A-coil; B-power receiving brushes 110a and 110b are used to supply the electric power to the B-coil. At least one of the A- and the B-power receiving brushes 109a, 109b, 110a and 110b contacts the slide ring 104 so as to receive the electric power, so phases of the pairs are mutually shifted 180°. Diodes 111a and 111b are connected to the A-power receiving brushes 109a and 109b and diodes 112a and 112b are connected to the B-power receiving brushes 110a and 110b so as to half-wave-rectify the AC current from the AC power source 105 and supply the half-wave-rectified current to the A-coil and the B-coil (see FIG. 17).

The power supply brushes 108a, 108b, the A-power receiving brushes 109a and 109b and the B-power receiving brushes 110a and 110b are respectively biased radially inward by electrically conductive plate springs 114a, 114b, 115a, 115b, 116a and 116b, which are provided to a housing 113 (see FIG. 18), so that they can contact the slide ring 104 (see FIG. 17).

The AC current supplied from the single-phase AC power source 105 is rectified by the rectifying circuit 106, which is connected to the coils 103, so that the permanent magnet rotor is magnetically started, as the DC motor, until its rotational speed reaches near the synchronous speed. Upon reaching near the synchronous speed, the commutator 101 is mechanically disconnected from the rectifying circuit 106, and the switch 107 is turned so as to short the AC power source 105 and the coils 103 so as to synchronously rotate the permanent magnet rotor 103. Note that, symbols C1, C2 and C3 stand for capacitors for absorbing surge current.

In the synchronous motors disclosed in JP7-232268, JP8-106929, etc., the permanent magnet rotor is started, as the DC motor, until its rotational speed reaches near the synchronous speed, then the commutator 101 is mechanically moved in the axial direction so as to electrically disconnect from the rectifying circuit 106 and turn the switch 107, so that power consumption can be highly improved in comparison with conventional induction motors, but number of parts must be increased, the structure must be complex and size of the motor cannot be smaller.

The rotor should be transferred from the start operation to the synchronous operation by one action, but the commutator is not always moved smoothly and power swing is sometimes occurred by overload, so that the rotor must be restarted and retransferred, namely the transition of the operation cannot be securely executed.

Further, a plurality of brushes and the slide ring repeatedly contact, so they are abraded and cannot fully contact, especially, in the case of high power motors whose power is 50 W or more, the current is apt to spark when the current direction is changed during the start operation, so safety and reliable synchronous motors are required.

DISCLOSURE OF THE INVENTION

An object of the present invention is to solve the above described problems of the conventional synchronous motors and to provide a small-sized reliable synchronous motor, whose energy consumption is low and which can securely transfer from the start operation to the synchronous operation.

To achieve the object, the present invention has following structures.

Namely, the synchronous motor of a first structure comprises: a permanent magnet rotor being rotatably attached in a housing proper and rotating about an output shaft; and a stator including coils, which are wound round a stator core, characterized by: the coils including an A-coil segment and a B-coil segment, which are connected in series; first measuring means for measuring rotational speed of the permanent magnet rotor and positions of magnetic poles thereof; second measuring means for measuring frequency of an AC power source; a start operation circuit rectifying alternate current, which is supplied from the AC power source, with a rectifying bridge circuit and changing the direction of the rectified current, which flows through the A-coil of the coils, according to rotational angle of the permanent magnet rotor by controlling switching means so as to start the permanent magnet rotor as a DC brushless motor; a synchronous operation circuit shorting the AC power source and the A- and the B-coils so as to synchronously rotate the permanent magnet rotor as an AC synchronous motor; switches being provided between the AC power source and the coils and switching the connection to the synchronous operation circuit; and control means turning off the switches to disconnect the synchronous operation circuit and controlling the switching means during the start operation, starting with suppressing input of inverted minus side of the AC power source, which is full-wave-rectified and flows through the A-coil of the coils via the rectifying bridge circuit, so as to make the current application range of the minus side shorter than that of the plus side, turning off the switching means and turning on the switches when the rotational speed of the permanent magnet rotor, which is measured by the first measuring means, reaches near synchronous speed with respect to the frequency of the power source, which is measured by the second measuring means, thereby the start operation circuit using the A-coil is disconnected and the synchronous operation circuit using the A- and B-coils is connected to transfer to the synchronous operation.

In the synchronous motor, the control means controls the switching means for predetermine time, during the start operation, so as to control the current application range of the inverted minus side of the rectified current, which is supplied from the AC power source and full-wave-rectified, flowing through the A-coil.

The synchronous motor may further comprise: third measuring means including: a sensor plate having slits, which are formed in a circumferential direction so as to introduce the current toward the coils; and an optical sensor detecting the slits, wherein the control means controls the switching means and switching-controls the current direction toward the A-coil of the coils, during the start operation, on the basis of output signals of the optical sensor.

In the synchronous motor, the third measuring means may include: a sensor plate having slits, which are formed in the circumferential direction so as to make the current application range of the inverted minus side of the rectified current, which is supplied from the AC power source and full-wave-rectified, flowing through the A-coil shorter; and an optical sensor for detecting the slits, and wherein the control means controls the switching means so as not to apply the current to the inverted minus side of the rectified current, within a prescribed angular range, on the basis of the output signals of the optical sensor.

In the synchronous motor, the first measuring means may include: a sensor plate having slits and shading sections, which are alternately formed and divide a portion between magnetic poles into odd number of parts; and an optical sensor detecting the slits and the shading sections, wherein the control means controls the switching means, detects the stop pole of the permanent magnet rotor on the basis of the output signals of the optical sensor, supplies the current to the A-coil to securely rotate the permanent magnet rotor in the normal direction during the start operation, switches the current direction toward the A-coil with measuring the rotational angle and the positions of the magnetic poles of the permanent magnet rotor, and apply no current to the inverted minus side of the rectified current within a prescribed angular range.

In the synchronous motor, the control means may repeatedly controls the switches SW1 and SW2 so as to transfer from the synchronous operation to the start operation and transfer to the synchronous operation again when power swing occurs.

In the synchronous motor, the stator core may include main core sections, from each of which a subcore section is extended in the opposite direction of the rotational direction of the permanent magnet rotor, and magnetic permeability of the main core section is greater than that of the subcore section.

In the synchronous motor, the stator may have a bobbin, which is attached to the stator core and includes a core shaft, whose axial line is perpendicular to an axial line of the permanent magnet rotor, and flanges, which are respectively provided to the both ends of the core shaft, and the A-coil and the B-coil are serially wound around the bobbin.

The synchronous motor of a second structure comprises: a permanent magnet rotor being rotatably attached in a housing proper and rotating about an output shaft; first measuring means for measuring rotational speed of the permanent magnet rotor and positions of magnetic poles thereof; second measuring means for measuring frequency of an AC power source; a stator including coils, which are an A-coil and a B-coil wound round a stator core and serially connected via an intermediate tap; a start operation circuit being connected to the AC power source and the intermediate tap of the coils and further connected to the A- and B-coils in parallel with respect to the AC power source, wherein a first and a second diodes for flowing the rectified current through the A-coil and a first and a second transistors, which can be switching-controlled so as to alternately changing the direction of the rectified current, are respectively connected in parallel, a third and a fourth diodes for flowing the rectified current through the B-coil and a third and a fourth transistors, which can be switching-controlled so as to alternately changing the direction of the rectified current, are respectively connected in parallel, the AC current of the AC power source is rectified by a first to a fourth diodes, and the first to the fourth transistors are switching-controlled so as to alternately flow the rectified current through the A-coil and the B-coil according to the rotational angle of the permanent magnet rotor 5 and start the permanent magnet rotor as a DC brushless motor; a synchronous operation circuit being connected to the AC power source and the B-coil so as to synchronously rotate the permanent magnet rotor as an AC synchronous motor; a switch switching the connection between the start operation circuit, to which the AC power sources and the intermediate tap are connected, and the synchronous operation circuit, to which the AC power source and the B-coil are connected; and control means alternately changing the current direction of the rectified current flowing through the coils, turning on/off the third and the fourth transistors of the start operation circuit so as to make a current application angular range, in which the current flows to the coils during one turn of the permanent magnet rotor, of the A-coil greater than that of the B-coil and converge the rectified current to the A-coil during the start operation, turning off the third and fourth transistors, which are connected to the B-coil and turning on the first and second transistors, which are connected to the A-coil when the rotational speed of the permanent magnet rotor, which is measured by the first measuring means, reaches near synchronous speed with respect to the frequency of the power source, which is measured by the second measuring means, and controlling the switch to change the connection from the intermediate tap to the B-coil so as to transfer the synchronous operation by the synchronous operation circuit.

In the synchronous motor, one combination of the third and fourth diodes and the third and fourth transistors, which are respectively connected in parallel, of the start operation circuit may be omitted so as to make current intensity of the A-coil greater than that of the B-coil during the start operation.

In the synchronous motor, the first measuring means may include a sensor plate having slits, which define directions and application range of the current flowing through the A-coil and the B-coil, wherein the first measuring means detects the slits, the control means switching-controls the first to the fourth transistors of the start operation circuit so as to make current intensity of the A-coil greater than that of the B-coil, during the start operation, on the basis of output signals of the first measuring means.

In the synchronous motor, the control means may repeatedly control the switch so as to transfer from the synchronous operation to the start operation and transfer to the synchronous operation again when power swing occurs.

In the synchronous motor, the stator core may include main core sections, from each of which a subcore section is extended in the opposite direction of the rotational direction of the permanent magnet rotor, and magnetic permeability of the main core section is greater than that of the subcore section.

In the synchronous motor, the stator may have a bobbin, which is attached to the stator core and includes a core shaft, whose axial line is perpendicular to an axial line of the permanent magnet rotor, and flanges, which are respectively provided to the both ends of the core shaft, and the A-coil and the B-coil are serially wound around the bobbin.

In the first structure, the control means controls the switching means during the start operation, and starts the motor with suppressing the input of the inverted minus side of the AC power source, which is full-wave-rectified and flows through the A-coil of the coils via the rectifying bridge circuit, so as to make the current application range of the minus side shorter than that of the plus side, then the control means turns off the switching means and turns on the switch so as to switch the connection from the start operation circuit using the A-coil to the synchronous operation circuit using the A- and the B-coils when the rotational speed of the permanent magnet rotor, which is measured by the first measuring means, reaches near the synchronous speed with respect to the power source frequency, which is measured by the second measuring means. With this action, the synchronous motor can smoothly and securely transfer from the start operation to the synchronous operation without shorting the start operation circuit.

In the second structure, the control means alternately changes the current direction of the rectified current flowing through the coils, turns on/off the third and the fourth transistors the start operation circuit so as to make the current application angular range, in which the current flows to the coils during one turn of the permanent magnet rotor, of the A-coil greater than that of the B-coil and converge the rectified current to the A-coil during the start operation, turns off the third and fourth transistors, which are connected to the B-coil, and turns on the first and second transistors, which are connected to the A-coil when the rotational speed of the permanent magnet rotor, which is measured by said first measuring means, reaches near synchronous speed with respect to the frequency of the power source, which is measured by the second measuring means, and controls the switch to change the connection from the intermediate tap to the B-coil so as to transfer the synchronous operation by the synchronous operation circuit, so that the synchronous motor can smoothly and securely transfer from the start operation to the synchronous operation without shorting the start operation circuit.

Especially, in the first and the second structures, no brushes and no commutators are provided, so sparking, which occurs when the current direction is changed during the start operation, can be prevented, so the safety and the reliability of the synchronous motor can be improved. Unlike the conventional synchronous motors, some mechanical parts, e.g., the commutator, the brushes, the switches, can be omitted, so the synchronous motor can be small in size and manufacturing cost can be reduced.

In the first and the second structures, the control means repeatedly controls the switches so as to transfer from the synchronous operation to the start operation, then transfer to the synchronous operation again when power swing occurs, so the synchronous motor can operate with high safety and reliability.

In the first and the second structures, if the stator core includes the main core sections, from each of which the subcore section is extended in the opposite direction of the rotational direction of the permanent magnet rotor, and the magnetic permeability of the main core section is greater than that of the subcore section, starting dead points of the permanent magnet rotor can be removed and stable rotation can be realized. In a two-pole and three-slot type motor, unlike the case of forming coils in a stator core, a space for accommodating the coils can be broader, so that number of turn of the coils can be increased so as to increase the power of the synchronous motor.

In the first and the second structures, if the stator has the bobbin, which is attached to the stator core and includes the core shaft, whose axial line is perpendicular to the axial line of the permanent magnet rotor, and the flanges, which are respectively provided to the both ends of the core shaft, and the coils are serially wound around the bobbin, a wasteful space, which is formed by the output shaft piercing through the stator core in the conventional motor, is not formed, so that the space for accommodating the coils can be broader, the number of turn of the coils can be increased, and the power of the synchronous motor can be increased.

In the first and the second structures, even if the power source frequency is changed, such as 50 Hz, 60 Hz, 100 Hz, the synchronous motor can be use without changing detail design, so the synchronous motor can be employed in wide fields.

BRIEF DESCRIPTION OF THE DRAWINGS

FIG. 4A is a wave form chart of an AC power source, FIG. 4B is a wave form chart of rectified current; FIG. 4C is a graph showing a relationship between voltage inputted to the coils, which is controlled on the basis of divided time, and rotational angle of the permanent magnet rotor, and FIG. 4D is a graph showing a relationship between the voltage inputted to the coils, which is controlled on the basis of the rotational angle, and the rotational angle of the permanent magnet rotor;

EMBODIMENTS

Preferred embodiments of the present invention will now be described in detail with reference to the accompanying drawings.

[First Embodiment]

Firstly, an outline of a two-pole synchronous motor will be explained with reference to FIGS. 2 and 3.

Figure 2A:
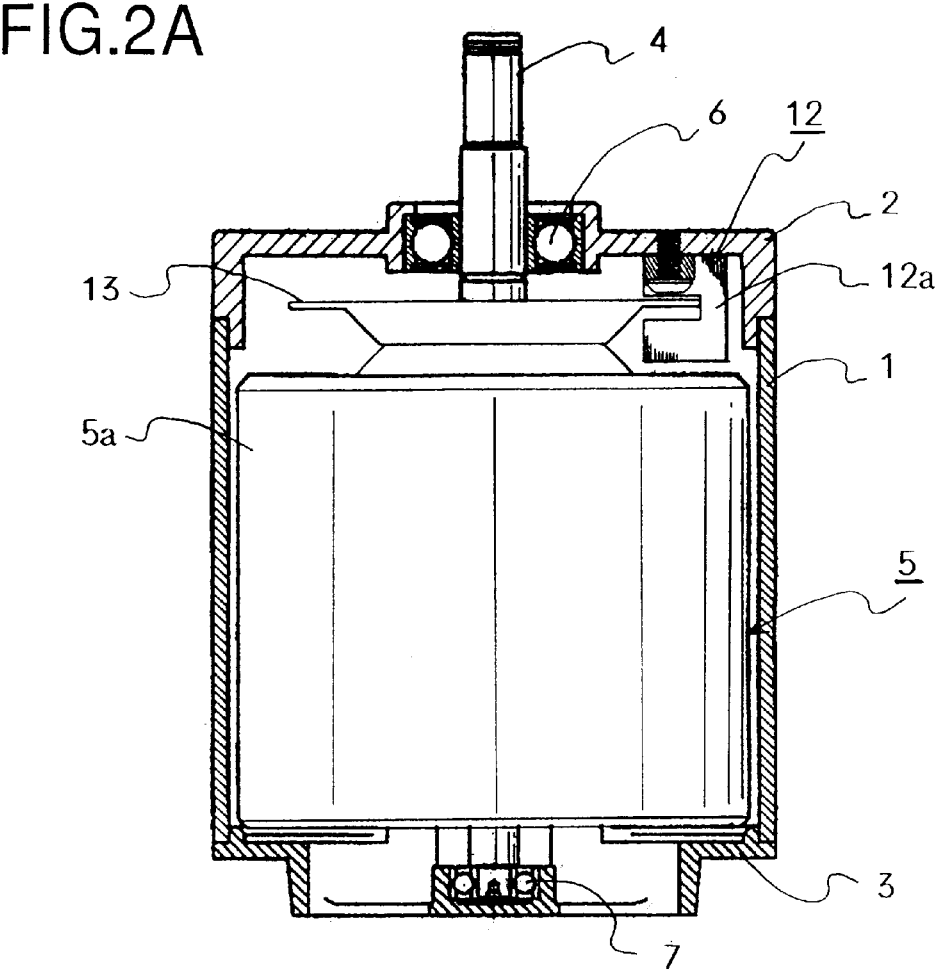
FIG. 2A is an explanation view of a permanent magnet rotor in a housing of the tow-pole synchronous motor.

In FIG. 2A, a symbol 1 stands for a housing proper accommodating a rotor and a stator, and its upper and lower ends are respectively covered by an upper housing section 2 and a lower housing section 3. The permanent magnet rotor 5 is rotatably accommodated in the housing 1 and capable of rotating an output shaft 4. The output shaft 4 is rotatably held by bearings 6 and 7, which are respectively provided to the upper housing section 2 and the lower housing section 3. By considering disorder of a magnetic field, the bearings 6 and 7 are made of a non-magnetizable material, e.g., stainless steel. As shown in FIG. 3C, a wiring hole 3a, through which wires connected to armature coils 9 are inserted, is formed in the lower housing section 3.

The permanent magnet rotor 5 includes a cylindrical rotor yoke 5a and a ring magnet 5b, which is held on an inner face of the rotor yoke and in which an N-pole and an S-pole are formed with angular separation of about 180°. The permanent magnet rotor 5 is started to rotate, by a magnetic repulsion force, which is generated by flowing electric current through the coils, about the output shaft 4. The magnet 5b may be made of an inexpensive material, e.g., ferrite, rubber, plastic, samarium cobalt, rare-earth metal, neodymium-iron-boron.

Figure 3A:
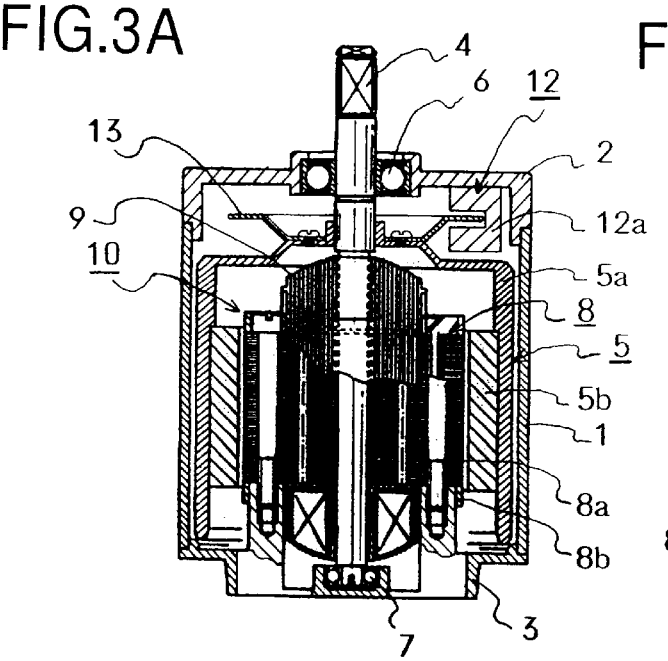
FIGS. 3A–3D are a front sectional view of the two-pole synchronous motor, an inner view of an upper housing section, a bottom view thereof and a plan view of stator coils.
Figure 3D:
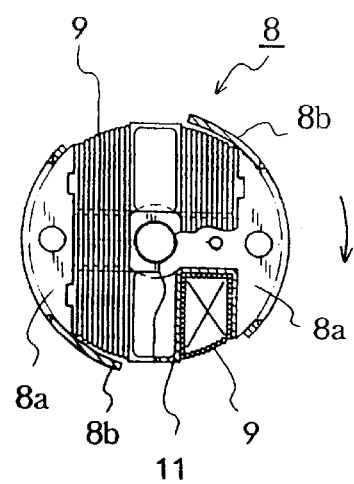
Figure 3B:
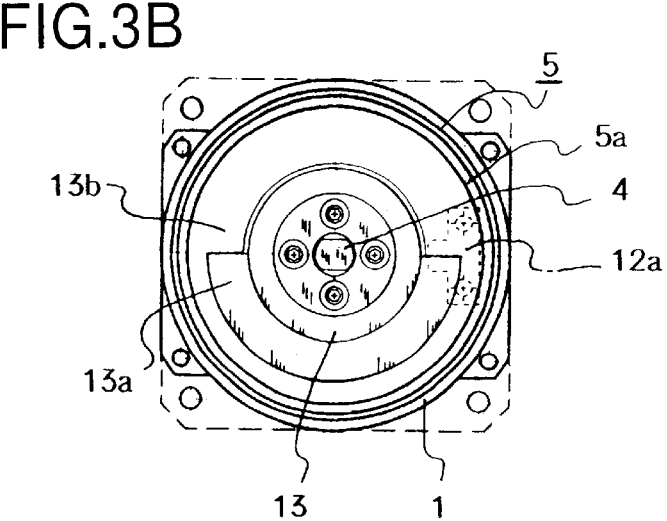
Figure 3C:
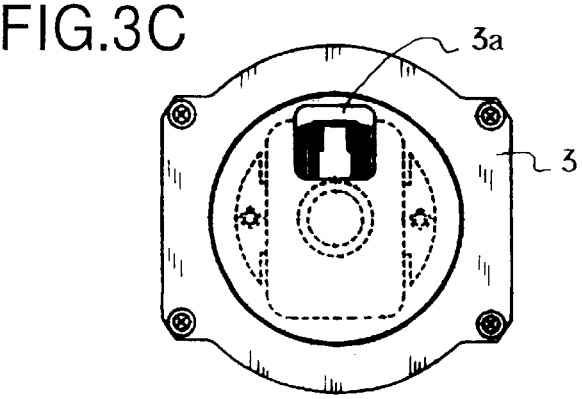

In FIG. 3A, a stator 10 including the coils 9, which are an A-coil and a B-coil serially wound round a stator core 8, is accommodated in a space enclosed by the permanent magnet rotor 5. As shown in FIG. 3D, the stator core 8 has main core sections 8a and subcore sections 8b, each of which is extended from each main core section 8b in a direction opposite to a rotational direction of the permanent magnet rotor 5. Magnetic permeability of the main core sections 8a is greater than that of the subcore sections 8b, so the main core sections 8a are preferably formed by piling flat-rolled silicon steel sheets, and the subcore sections 8b are preferably formed by an SPC material (cold-rolled steel sheet). The permanent magnet rotor 5 stops at positions, at each of which magnetic resistance is made minimum (namely, each magnetic poles faces a point shifted from the main core section 8a toward the subcore section 8b). Therefore, starting dead points can be removed and the permanent magnet rotor 5 can be stably started to rotated in a prescribed direction.

The stator core 8 is integrated with a bobbin 11, and the coils 9, in which the A- and B-coils are connected in series, are continuously wound round the bobbin 11. With this structure, a space for accommodating the coils, with respect to the bobbin 11, can be broader, so that, unlike a two-pole three-slot type motor, number of turn of the coils 9 can be increased so as to increase the power of the synchronous motor.

Figure 2B:
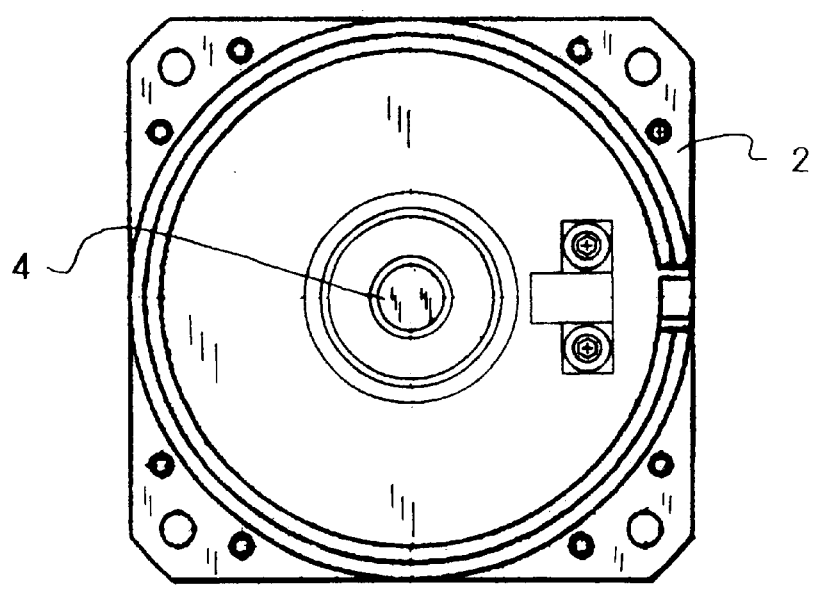
FIG. 2B is a plan view of the motor.

In FIGS. 2A and 3A, an optical sensor 12, which is a first measuring means for measuring rotational speed of the permanent magnetic rotor 5 and positions of the magnetic poles thereof, is provided in the upper housing section 2. For example, the optical sensor 12 includes an optical element 12a, which has a light emitting source and a light receiving element, and a rotary plate 13, which has a light-passing section 13a and a shading section 13b, whose central angles are 180°. The rotary plate 13 is integrated with the permanent magnet rotor 5 and capable of rotating about the output shaft 5 (see FIG. 3B). The optical sensor 12 measures the rotational speed and the positions of the magnetic poles of the permanent magnet rotor 5 with the rotary plate 13, so the optical sensor 12 generates pulses corresponding to the rotational speed, and control means, explained later, switching-controls a start operation circuit 14 at prescribed timing based on the pulses. As shown in FIGS. 2A and 2B, the optical element 12a is fixed, by screws, on an inner wall of the upper housing section 2.

Note that, the optical sensor 12 is a light-passing type sensor or a light-reflecting type sensor. Rotational measuring means of the sensor 12 may be a Hall element, a magnetic resistance element, a magnet sensor including coils, high frequency induction means, capacitance measuring means, etc..

Figure 1:
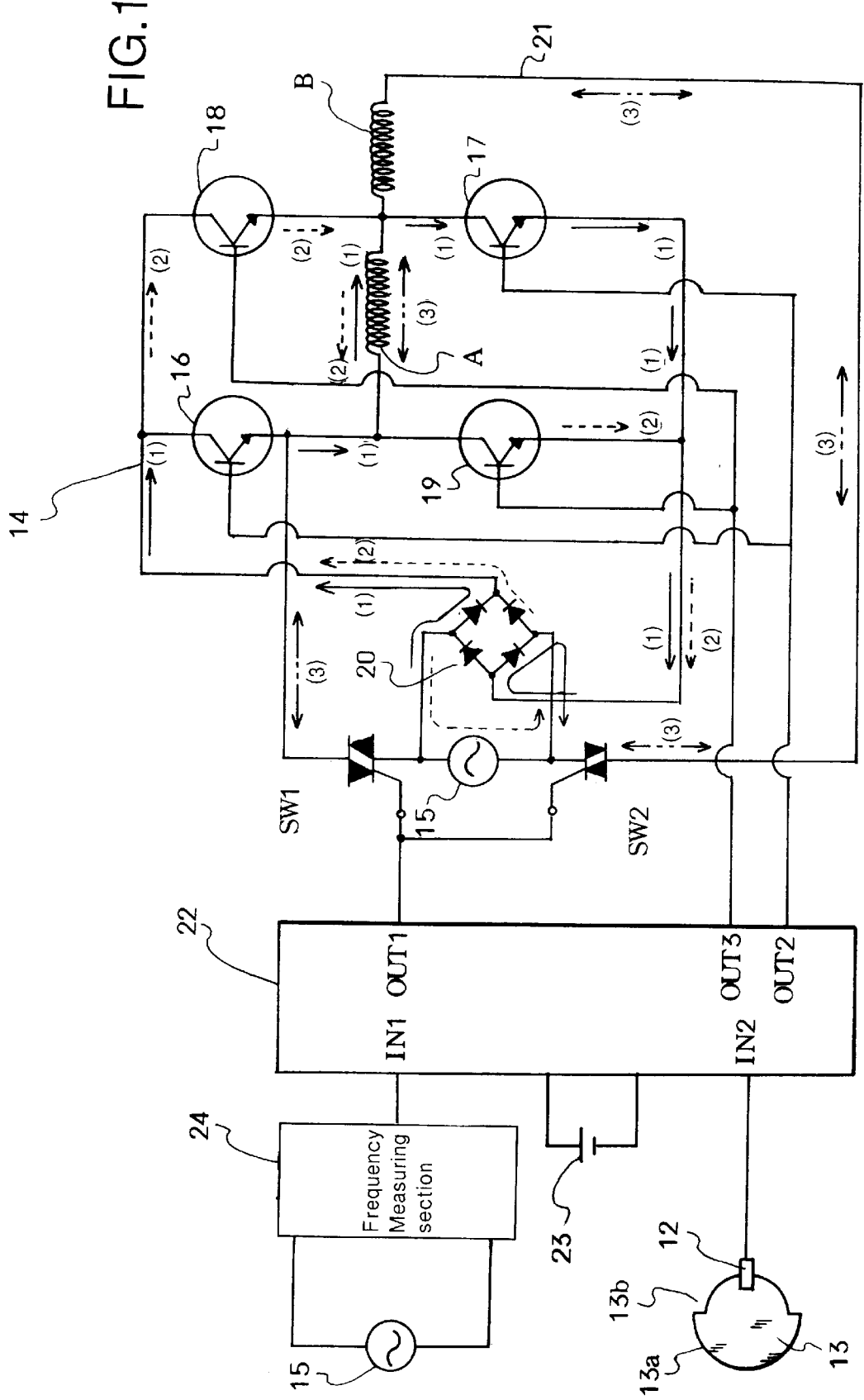
FIG. 1 is an explanation view of a start operation circuit and a synchronous operation circuit of a two-pole synchronous motor of a first embodiment.

Next, the start operation circuit for starting the two-pole synchronous motor, the synchronous operation circuit and control means for switching-controlling the circuits will be explained with reference to FIG. 1. In FIG. 1, the start operation circuit 14 rectifies the AC current from the single-phase AC power source 15 with a rectifying bridge circuit 20 and switching controls the switching means so as to flow the rectified current to the A-coil of the coils 9 only and start the permanent magnet rotor 5 as a DC brushless motor. The synchronous circuit 21 shorts the AC power source 15 and the coils 9 and synchronously rotates the permanent magnet rotor 5 as an AC synchronous motor. There are provided triacs SW1 and SW2, as switches, between the AC power source 14 and the A- and the B-coils. The triacs SW1 and SW2 are turned on/off by inputting a gate pulse without reference to poles of the AC current, so that a connection to the start operation circuit 14 or the synchronous operation circuit 21 is switched.

In FIG. 1, a first transistor 16 and a second transistor 17 are respectively connected between the A-coil and the rectifying bridge circuit 20 in series, as switching means. And a third transistor 18 and a fourth transistor 19 are also respectively connected between the A-coil and the rectifying bridge circuit 20 in series, as switching means.

A symbol 22 stands for a microcomputer, which switching-controls current intensity and a current direction in the start operation circuit 14 during the start operation and switching-controls the switches when the motor transfers from the start operation to the synchronous operation as the control means. A symbol 23 stands for a low level power source for driving the microcomputer. Namely, the microcomputer controls the first to fourth transistors 16–19 and starts the motor with suppressing input of inverted minus side of the AC power source 15, which is full-wave-rectified and flows through the A-coil of the start operation circuit 14, so as to make the current application range of the minus side shorter than that of the plus side, then the microcomputer turns off the first to fourth transistors 16–19 when the rotational speed of the permanent magnet rotor 5 measured by the optical sensor 12 reaches near the synchronous speed and turns on the triacs SW1 and SW2 so as to make switch to the synchronous operation circuit 21 and transfer to the synchronous operation.

Frequency of the AC power source 15, which has been measured by a frequency measuring section 24, which acts as a second measuring means, is inputted to an input terminal IN1 of the microcomputer 22. The rotational speed and the positions of the magnetic poles of the permanent magnet rotor 5 are measured by the optical sensor 12 and inputted to an input terminal IN2.

Switching signals are outputted from an output terminal OUT1 and sent to the triacs SW1 and SW2; signals for turning on/off the first and the second transistors 16 and 17 are outputted from an output terminal OUT2; and signals for the third and the fourth transistors 18 and 19 are outputted from an output terminal OUT3. The microcomputer 22 outputs base current from the output terminal OUT2 so as to turn on the first and the second transistors 16 and 17 only (at that time, the rectified current in the start operation circuit 14 flows in the direction shown by solid line arrows (1) during a rotational angle of 0–180°, which is defined on the basis of the positions of the magnetic poles of the permanent magnet rotor 5 detected by the optical sensor 12; The microcomputer outputs base current from the output terminal OUT3 so as to turn on the third and the fourth transistors 18 and 19 only (at that time, the rectified current in the start operation circuit 14 flows in the direction shown by dotted line arrows (2)) during the rotational angle of 180–360°, the current direction in the A-coil is changed in every 180°.

When the rotational speed of the permanent magnet rotor 5 measured by the optical sensor 12 reaches near the frequency of the AC power source 15 measured by the frequency measuring section 24, the first to fourth transistors 16–19 are turned off and the triacs SW1 and SW2 are turned of, so that the AC current, which is shown by two-dot chain line arrows (3), flows through the synchronous operation circuit 21.

The case of flowing the rectified current (1) and (2) through the start operation circuit 14 will be explained with reference to FIG. 1. During the rotational angle of the permanent magnet rotor 5 is 0–180°, the base current is output from the output terminal OUT2 and the first and the second transistors 16 and 17 are simultaneously turned on. At that time, the rectified current (1) flows through the A-coil via the rectifying bridge circuit 20. On the other hand, during the rotational angle of the permanent magnet rotor 5 is 180–360°, the base current is output from the output terminal OUT3 and the third and the fourth transistors 18 and 19 are simultaneously turned on. At that time, the rectified current (2) flows through the A-coil via the rectifying bridge circuit 20.

The microcomputer 22 switching-controls the current application range to divide the inverted input of the minus side of the AC power source 15 (see dotted-line parts of sine waves shown in FIGS. 4B and 4C), which has been full-wave-rectified current, by predetermined time. Voltage inputted to the A-coil is shown in FIG. 4C, in which the current direction of the rectified current (1) flowing through the A-coil of the start operation circuit 14 shown in FIG. 1 is a "+" side, and the current direction of the rectified current (2) flowing there through is a "−" side. Note that, hatched parts in FIG. 4 are the current application range.

During the start operation, the microcomputer 22 switching-controls the first to fourth transistors 16–19 of the start operation circuit 14 for the predetermined divided time, which is defined by dividing the time length of the inverted input of the minus side of the AC power source 15, which has been full-wave-rectified current and flows through the A-coil. The first to the fourth transistors 16–19 are switching-controlled to suppress the inverted input of the minus side of the AC power source 15, which has been full-wave-rectified current and flows through the A-coil, to make the current application rang of the minus side shorter than that of the plus side when the permanent magnet rotor 5 is started. With this action, the rectified current flowing through the A-coil converges to the input of the plus side of the AC power source 15.

In FIG. 1, when the optical sensor 12 measures the rotational speed of the permanent magnet rotor 5 which has reached near the synchronous speed, the microcomputer 22 turns off the first to fourth transistors 16–19, then turns on the triacs SW1 and SW2, so that the circuit is changed from the start operation circuit 14 to the synchronous operation circuit 21. At that time, the AC current flows through the series A- and B-coils of the coils 9 in the direction of the arrows (3), the permanent magnet rotor 5 synchronously rotates with the change of the magnet poles of the coils 9, so that the motor rotates as the AC synchronous motor. The coils 9 are the series A- and B-coils, so the AC current flowing through the coils is capable of generating enough torque for the synchronous operation. Note that, the triacs SW1 and SW3 are turned on after the first to the fourth transistors 16–19 are turned off so as to prevent short circuit of the first to fourth transistors 16–19. Note that, if the inverted input of the minus side of the AC power source 15, which has full-wave-rectified and flows the A-coil during the start operation, is not suppressed, the motor is transferred to the synchronous by the input of the minus side or plus side with probability of 50%, further if the transition is occurred by the input of the minus side, the power swing occurs and the start operation is repeated. To avoid these disadvantages, the input of the minus side of the AC power source 15 is suppressed.

When the power swing is occurred due to changing load, etc., the microcomputer 22 transfers to the start operation after the rotational speed of the permanent magnet rotor 5 is made slower than prescribed speed, then transfers to the synchronous operation again. For example, in the case of the two-pole synchronous motor driven by the power source of 60 Hz, a threshold value of the rotational speed of the permanent magnet rotor 5 for transition from the start operation to the synchronous operation is 3,550 rpm, and a threshold value of the rotational speed of the permanent magnet rotor 5 for retransition to the start operation, which is occurred by the power swing, is 3,200 rpm; the motor can be stably rotated by repeatedly controlling the operational states. The threshold values for changing the operational states may be defined on the basis of output power, use, size, etc. of the motor.

In the two-pole synchronous motor of the present embodiment, since the transition from the start operation to the synchronous operation is controlled by the microcomputer 22, the two-pole synchronous motor can be used without changing specification even if the power source frequency is changed to 50 Hz, 60 Hz, 100 Hz, etc., so the wide-usable synchronous motor can be provided.

Figure 5:
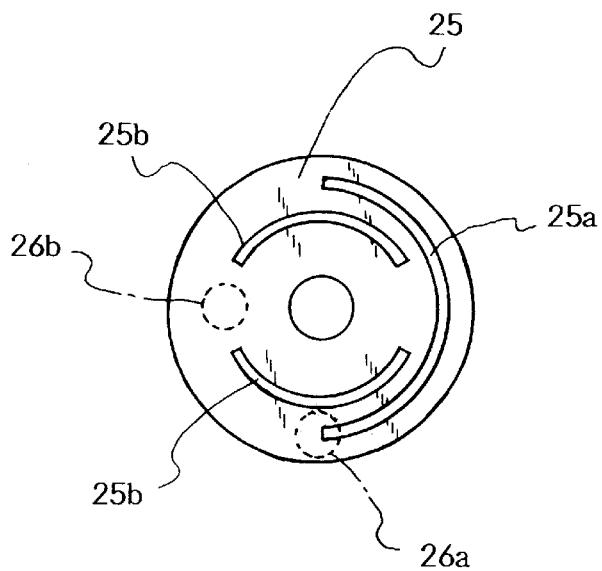
FIG. 5 is an explanation view of an optical sensor and a sensor plate, which are used for measuring the rotational angle.

Another means for switching-controlling in the range of the inverted input of the minus side of the AC power source 15, which has been full-wave-rectified and flows through the A-coil, during the start operation will be explained. Besides the optical sensor 12, which measures the rotational speed and the pole positions of the permanent magnet rotor 5, and the rotary plate 13 (the first measuring means), a sensor plate 25 having slits 25*a* and 25*b*, which define the current direction for flowing through the A-coil and the current application range, and optical sensors 26*a* and 26*b* (the third measuring means) may be employed as shown in FIG. 5. The slit 25*a* defines the current direction in the A-coil; the optical sensor 26*a* outputs signals of detecting the slit. The slits 25*b* define the current application range so as to make the range of the inverted input of the minus side of the AC power source 15, which has been full-wave-rectified and flows through the A-coil, short, and the optical sensor 26*b* outputs signals of detecting the slits.

Namely, during the start operation, the microcomputer 22 turns on/off the first to the fourth transistors; at that time, the rectified current, for example, flows through the A-coil as shown in FIG. 4D. In FIG. 4D, no rectified current corresponding to the minus side flows through the A-coil in the ranges 30° before and after every 180° of the rotational angle of the permanent magnet rotor 5. In this case, the current direction and the current application range of the A-coil are defined by the sensor plate 25, so complex switching action, which corresponds to the input of the minus side of the AC power source 15, by the microcomputer 22 is not required, so that control can be simplified.

In the two-pole synchronous motor, the microcomputer 22 controls the first to the fourth transistors 16–19 during the start operation so as to make the current application range of the inverted input of the minus side of the Ac power source 15, which has full-wave-rectified and flows the A-coil of the coils 9 via the rectifying bridge circuit 20, shorter than that of the plus side, further turns on the triacs SW1 and SW2 when the rotational speed of the permanent magnet rotor 5 measured by the optical sensor 12 reaches near the synchronous speed regulated by the power source frequency and measured by the frequency measuring section 25, so that the synchronous operation circuit 21 can be connected and the motor can be smoothly and securely transferred from the start operation to the synchronous operation.

Since no commutator and brushes are provided in the start operation circuit 14, spark can be prevented when the current direction is changed during the start operation, so that the safe and reliable synchronous motor, which is capable of synchronously operated with optional power source frequency, can be realized. Unlike the conventional motor, no commutator and brushes are required and the switching means can be simplified, so the size of the motor can be smaller and manufacturing cost can be reduced.

When the power swing occurs, the microcomputer 22 once transfers from the synchronous operation to the start operation, then retranfers to the synchronous operation, so that the safe and reliable synchronous motor can be realized.

The stator core 8 includes the main core sections 8*a*, from each of which the subcore section 8*b* is extended in the direction opposite to the rotational direction of the permanent magnet rotor 5, and magnetic permeability of the main core sections 8*a* is greater than that of the subcore sections 8*b* so as to mit starting dead points of the permanent magnet rotor 5 and make the rotational direction thereof stable.

Unlike the two-pole and three-slot type motor in which an armature coils are accommodated in a slot, a space for winding coils 9 of the stator core 8 can be broader, so that number of turns of the coils 9 can be increased and output efficiency of the motor can be made higher.

Figure 6A:
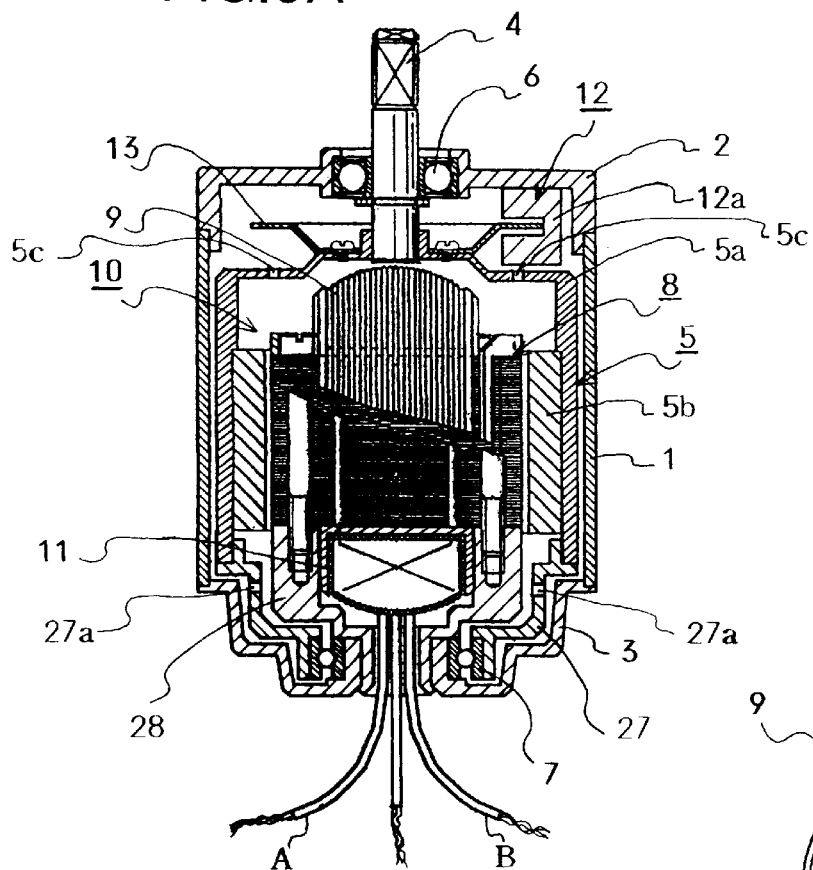
FIG. 6A is a front sectional view of the two-pole synchronous motor of another example and FIG. 6B is a plan view of the stator coil thereof.

In the two-pole synchronous motor, as shown in FIG. 6A, one end of the output shaft 4 is connected to a rotor yoke 5*a* of the permanent magnet rotor 5, and a rotor yoke holding member 27 may be connected to the rotor yoke 5*a*. In the stator 10, the stator core 8 is fixed to a stator base 28, and the stator base 28 is fitted in the lower housing section 3. The permanent magnet rotor 5 is rotatably held by a bearing 6, which is provided to the upper housing section 2, and a bearing 7, which is provided between the rotor yoke holding member 27 and the lower housing section 3.

Heat radiating holes 5*c* and 27*a* are respectively bored in the rotor yoke 5*a* and the rotor yoke holding member 27. When the permanent magnet rotor 5 starts to rotate, air inside and outside of the motor is circulated through the heat radiating holes 5*c* and 27*a*, so that heat generated in the stator 10 can be radiated outside.

Figure 6B:
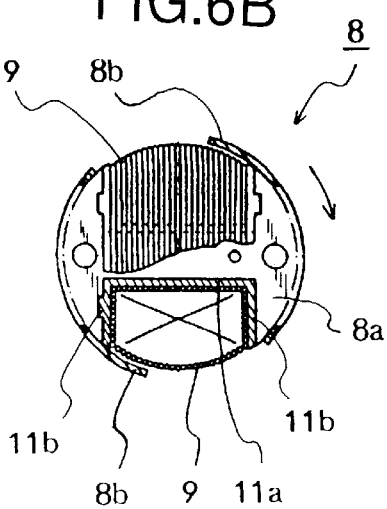

As shown in FIG. 6B, the A- and B-coils are formed by continuously winding a wire round the bobbin 11 having a core shaft 11*a*, whose axial line is perpendicular to an axial line of the permanent magnet rotor 5, and flanges 11*b*, which are respectively provided to the both ends of the core shaft 11*a*. With this structure, no wasteful space for piercing the output shaft 8 through the stator core 8 is required, so that the space for winding the coils can be broader and the output efficiency of the motor can be made higher.

Another example of the first measuring means, which is capable of measuring the rotational speed and the pole positions of the permanent magnet rotor 5, will be explained with reference to FIGS. 7 and 8. A sensor plate is a circular disk and has shading sections 29*a* and slits 29*b*, which are alternately formed along an outer edge and which divide an angle between the magnetic poles into odd number. The sensor plate 29 stops at the position in front of the optical sensor 12 when the shading section or the slit corresponding to the N-pole or the S-pole faces the optical sensor.

Since the two magnetic poles of the permanent magnet rotor 5 are separated 180°, the slits 29*b* of the sensor plate 29 divide 180° into the odd number (13 in FIG. 7), so that the optical sensor 12, one of the slits 29*b* and one of the shading sections 29*a* are always arranged on the same straight line. With this structure, the microcomputer can securely detect if the permanent magnet rotor 5 stops on the N-pole side or the S-pole side (see FIG. 7).

In the case of a four-pole rotor, the N-poles and the S-poles are arranged in the permanent magnet rotor 5 with angular separations of 90°, and the angle 90° is divided into the odd number (13 in FIG. 8), so that the optical sensor 12 can detect the slits 29*b* and the shading sections 29*a* alternately. With this structure, the microcomputer can securely detect if the permanent magnet rotor 5 stops on the N-pole side or the S-pole side (see FIG. 8).

Figure 7:
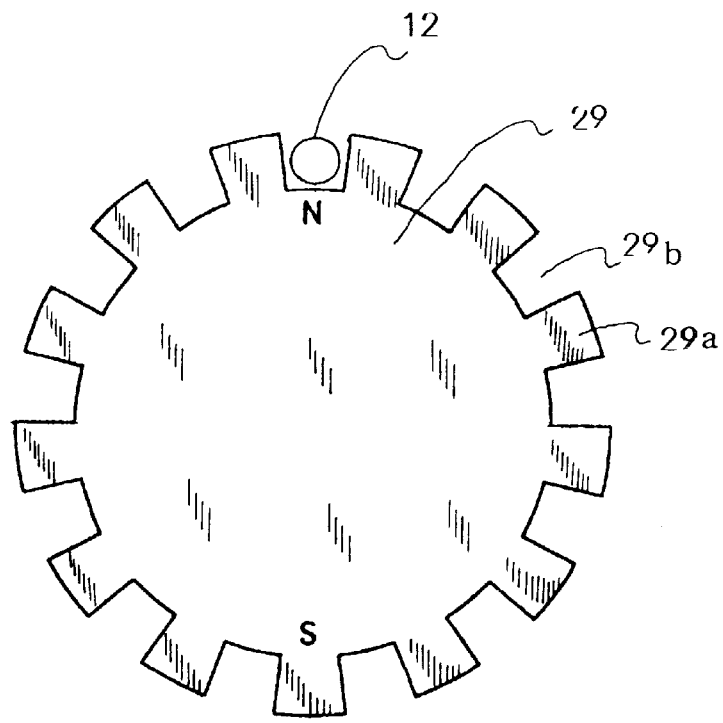
FIG. 7 is an explanation view of the optical sensor and the sensor plate of another example.
Figure 8:
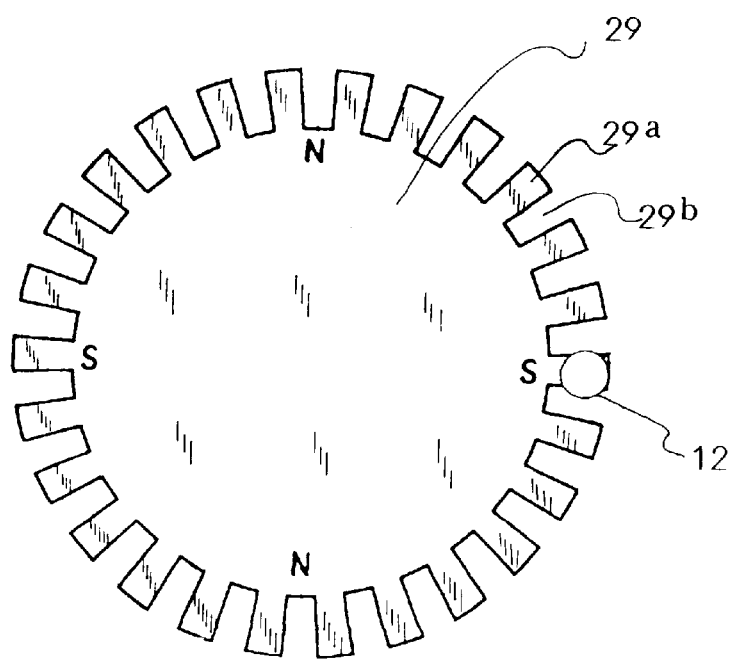
FIG. 8 is an explanation view of the optical sensor and the sensor plate of a four-pole synchronous motor.

In FIG. 7, for example, if the optical sensor 12 detects the rotor stopping at the N-pole (the sensor is ON), the microcomputer 22 flows the rectified current through the A-coil in the direction of the arrows (1) shown in FIG. 1 so as to start to rotate the permanent magnet rotor 5 in the normal direction. If the optical sensor detects the rotor stopping at the S-pole (the sensor is OFF), the microcomputer 22 flows the rectified current through the A-coil in the direction of the arrows (2) shown in FIG. 1 so as to start to rotate the permanent magnet rotor 5 in the normal direction.

The current direction of the A-coil is switched by counting the slits 29a of the slit 29 by the optical sensor 12; if the rotational angle of the permanent rotor 5 is 0–180°, only the first and the second transistors 16 and 17 are simultaneously turned on to switching-control; if the rotational angle thereof is 180–360°, only the third and the fourth transistors 18 and 19 are simultaneously turned on to switching-control. The current application range of the A-coil is controlled by turning on/off the first to the fourth transistors 16–19 so as to flows the current through the A-coil within a prescribed rotational angle, which is measured by counting a part of the slits 29b corresponding to the N-pole or the S-pole within the range, in which the microcomputer 22 suppresses the inverted input of the minus side of the AC power source 15 full-wave-rectified.

The combination of the sensor plate 29 and the optical sensor 12 is capable of measuring and detecting the rotational speed, the rotational angle and the pole positions of the permanent magnet rotor 5 and the current direction and the current application range of the A-coil, so that number of parts can be reduced, the structure of the motor can be simplified and the size of the motor can be smaller.

In the present embodiment, the sensor plates 29 are for the two-pole and the four-pole synchronous motors, but the sensor plate, which is capable of dividing the angle between the poles into the odd number, is not limited to the examples. Generally, the sensor plate can be applied to the motors having six poles or more, if it satisfies the following formula: (a dividing angle of the sensor plate)=(360°/number of the poles)/(odd number). Note that, the current application range on the inverted side, which suppresses the rectified current flowing through the coils 9, can be optionally defined by the microcomputer 22. Further, the present invention is not limited to the optical sensor, so a cylindrical magnet, on which a plurality of the magnetic poles are arranged, and a Hall element for detecting the magnetic poles may be employed.

[Second Embodiment]

The two-pole synchronous motor of another embodiment will be explained. In the present embodiment, the A-coil and the B-coil of the coils 9, which are wound round the stator core 8 of the stator 10, are serially connected with an intermediate tap 30, but the basic structure of the present embodiment is almost equal to the two-pole synchronous motor of the first embodiment (see FIGS. 3 and 4), so elements explained in the former embodiment are assigned the same symbols and explanation will be omitted.

Therefore, the start operation circuit for starting the two-pole synchronous motor, the synchronous operation circuit and the control means for controlling the circuits will be explained with reference to FIGS. 9 and 10.

Figure 9:
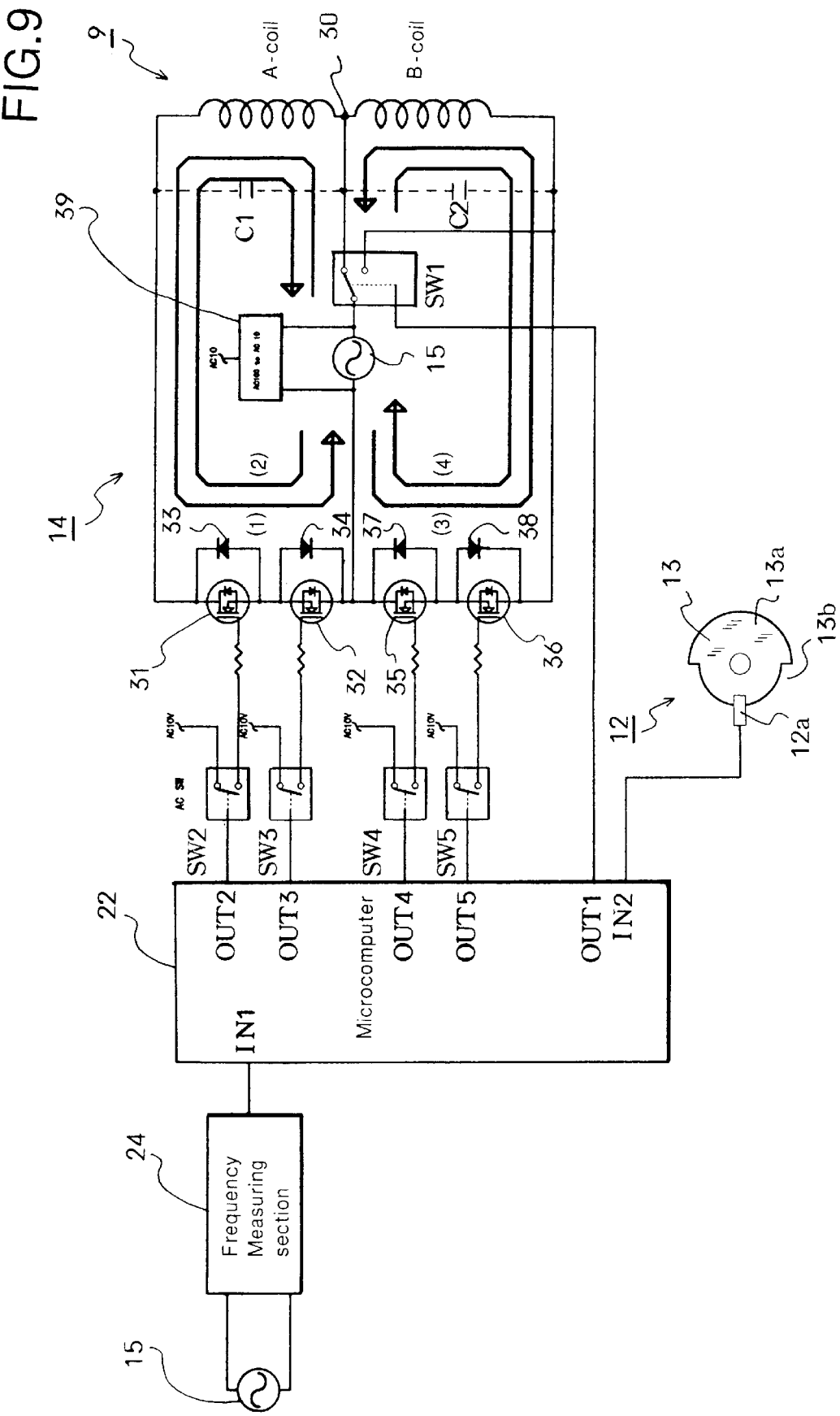
FIG. 9 is a circuit diagram showing a state of the start operation of the two-pole synchronous motor of a second embodiment.

In FIG. 9, the intermediate tap 30 of the coils 9 is connected to the AC power source 15, and the A-coil and the B-coil are connected in parallel with respect to the AC power source 15. A first and a second diodes 16 and 17 for flowing the rectified current and a first and a second FETs 16 and 17 for alternately changing the current direction of the rectified current are respectively connected to the A-coil in parallel; a third and a fourth diodes 22 and 23 for flowing the rectified current and a third and a fourth FETs 20 and 21 for alternately changing the current direction of the rectified current are respectively connected to the B-coil in parallel. The first to the fourth FETs 16, 17, 20 and 21 are switching-controlled so as to rectify the AC current from the AC power source 15 by the first to the fourth diodes 18, 19, 22 and 23 and alternately flow the rectified current through the A-coil or the B-coil on the basis of the rotational angle of the permanent magnet rotor 5, so that the permanent magnet rotor 5 can be started as the DC brushless motor. In FIG. 10, the AC power source 15 is connected to the B-coil, and the A-coil and the B-coil are connected in series with respect to the AC power source 15, then the synchronous operation circuit 21 rotates the permanent magnet rotor 5 as the AC synchronous motor. The switch SW1 switches the connection between the start operation circuit 14, to which the AC power source 15 and the intermediate tap 30 are connected, and the synchronous operation circuit 39, to which the AC power source 15 and the B-coil are connected. is provided between the AC power source 15 and the intermediate tap 30, and the switch SW1 switches the connection with the start operation circuit 14 or the synchronous operation circuit 21.

In FIG. 9, a first and a second FETs (Field-Effect Transistor) 31 and 32 are serially connected to the A-coil as switching means. A first and a second diodes 33 and 34 are respectively connected to the first and the second FETs 31 and 32 in parallel as rectifying means. A third and a fourth FETs (Field-Effect Transistor) 35 and 36 are serially connected to the B-coil as switching means. A third and a fourth diodes 37 and 38 are respectively connected to the third and the fourth FETs 35 and 36 in parallel as rectifying means. Note that, in FIG. 9, capacitors C1 and C2 may be respectively connected to the A-coil and the B-coil in parallel as shown by dotted lines. The capacitors C1 and C2 can make power factor of the electric power, which is consumed by the coils 9, higher, make up for power loss and absorb high level serge current.

The symbol 22 stands for the microcomputer, which acts as the control means, switching-controls the start operation circuit 14 so as to control the current intensity and the current direction in the start operation circuit 14 during the start operation, and switching-controls the switch SW1 so as to transfer from the start operation to the synchronous operation. Namely, the microcomputer alternately changes the current direction of the rectified current flowing through the coils 9, turns on/off the third and the fourth FETs 20 and 21 so as to make the current application angular range, in which the current is applied to the coils 9 during one turn of the permanent magnet rotor 5, of the A-coil greater than that of the B-coil and converge the rectified current to the A-coil during the start operation, turns off the third and the fourth FETs 20 and 21 connected to the B-coil, turns on the first and the second FETs 16 and 17, and changes the connection of the switch SW1 from the intermediate tap 30 to the B-coil so as to transfer to the synchronous operation by the synchronous circuit 39 when the rotational speed of the permanent magnet rotor 5 measured by the optical sensor 12 reaches near the synchronous speed with respect to the power source frequency.

The frequency measuring section 24, which acts as the second measuring means, measures the frequency of the AC power source 15 and the result is inputted to the input terminal IN1 of the microcomputer 22. The rotational speed and the pole positions of the permanent magnet rotor 5 are measured by the optical sensor 12, and the result is inputted to the input terminal IN2.

Switching signals for switching the switch SW1 are outputted from the output terminal OUT1, switching signals for turning on/off the switches SW2–SW5 are outputted from the output terminals OUT2–OUT5, and gate pulses are selectively inputted to gates of the first FET 31, the second FET 32, the third FET 35 and the fourth FET 36 from an FET driving source 39. The microcomputer 22 turns on/off the switches SW2 and SW4 (the rectified current (1) and (3) flows through the start operation circuit 14 while ON) with corresponding to the pole positions of the permanent magnet rotor 5 detected by the optical sensor 12 and controls the first FET 31, the second FET 32, the third FET 35 and the fourth FET 36 by turning on/off the switches SW3 and SW5 (the rectified current (2) and (4) flows through the start operation circuit 14 while ON). Note that, relays or semiconductor switches (e.g., triacs, photo couplers, transistors, IGBT) may be employed as the switches SW1–SW5.

Action of the start operation circuit 14, through which the rectified currents (1) and (3) flow, will be explained with reference to FIG. 1. When only the switches SW2 and SW4 are turned on, the first and the third FETs 31 and 35 are turned on with the current direction (1) and (3). At that time, the rectified current (1) flows through the A-coil via the first FET 31 and the second diode 24; the rectified current (3) flows through the B-coil via the third FET 35 and the fourth diode 38; the both currents alternately flow according to the AC wave form.

In the case of flowing the rectified currents (2) and (4) through the start operation circuit 14, the second and the fourth FETs 32 and 34 are turned on when only the switches SW3 and SW5 are turned on. At that time, the rectified current (2) flows through the A-coil via the second FET 32 and the first diode 33; the rectified current (4) flows through the B-coil via the fourth FET 36 and the third diode 37; the both currents alternately flow according to the AC wave form.

Figure 11:
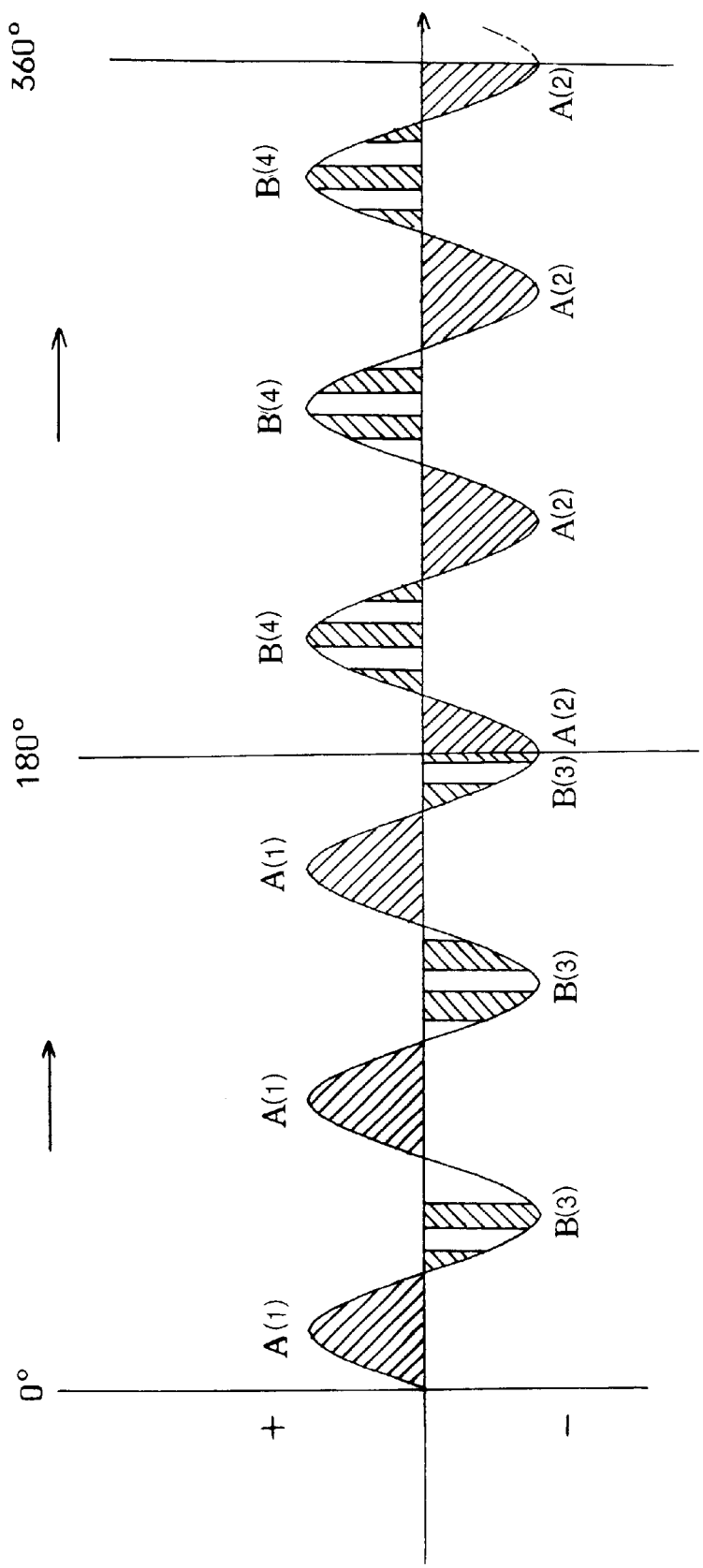
FIG. 11 is a graph showing the relationship between the voltage inputted to the coils and the rotational angle of the permanent magnet rotor.

The microcomputer 22 makes the current application angular range, in which the current flows through the coils 9 during one turn of the permanent magnet rotor 5, of the A-coil is greater than that of the B-coil and converges the rectified current to the A-coil for starting the motor. FIG. 11 is the graph showing a relationship between voltage inputted from the AC power source 15 to the coils 9 and the rotational angle of the permanent magnet rotor 5. In the start operation circuit 14 shown in FIG. 9, the current direction of the rectified current (1) and (4) is a "+" side of the voltage wave form; the current direction of the rectified current (2) and (3) is a "−" side thereof. Hatched sections of FIG. 11 are the current application angular range.

The microcomputer 22 switching-controls the switches SW1–SW5 of the start operation circuit 14 on the basis of the predetermined current application angular range during the start operation. Foe example, as shown in FIG. 11, only the switches SW4 and SW5 are repeatedly turned on/off on the basis of the current application range, so that the rectified currents (3) and (4) flowing through the B-coil are suppressed and the rectified currents (1) and (2) flowing through the A-coil are increased so as to converge the total current to the A-coil. With accelerating the rotational speed of the permanent magnet rotor 5, the switches SW2–SW5 are synchronously switching-controlled with the rotation of the permanent magnet rotor 5 until reaching near the synchronous speed.

Figure 10:
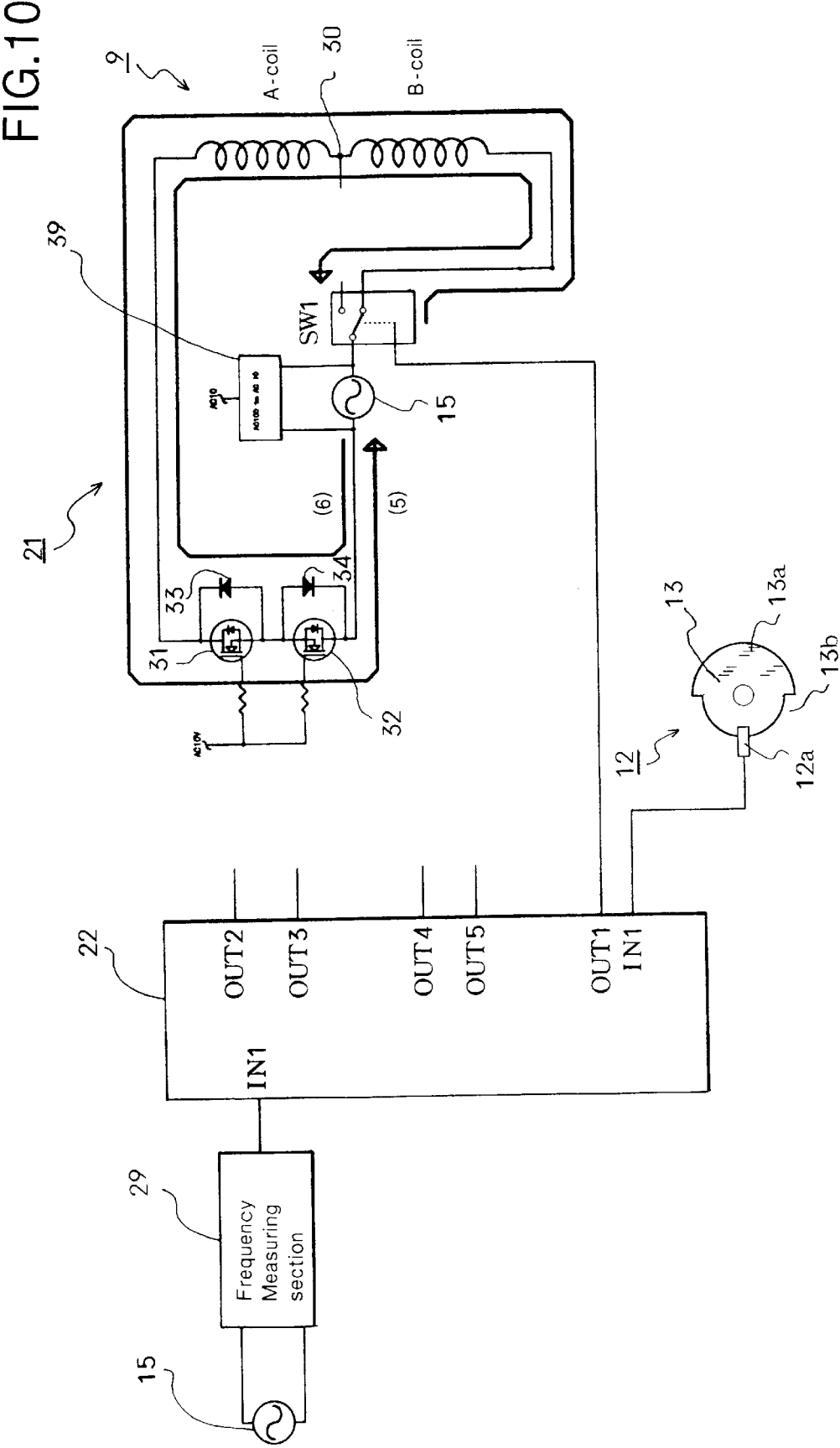
FIG. 10 is a circuit diagram showing a state of the synchronous operation of the two-pole synchronous motor.

When the rotational speed of the permanent magnet rotor 5, which is measured by the optical sensor 12, reaches near the synchronous speed, the microcomputer 22 controls the switch SW1 shown in FIG. 10 to changing the connection from the start operation circuit 14 to the synchronous operation circuit 21. Namely, the switches SW4 and SW5 are turned off, then the switch SW1 is switched and the switches SW2 and SW3 are simultaneously turned on, so that the first FET 31 and the second FET 32 are turned on to transfer to the synchronous operation. At that time, the A-coil and the B-coil of the coils 9 are connected in series, the AC currents (5) and (6) shown in FIG. 10 flow the coils, and the permanent magnet rotor 5 is synchronously rotated with the change of the magnetic poles of the coils 9 as the AC synchronous motor. Since the coils 9 are the A-coil and the B-coil which are connected in series, the AC current flowing there through is capable of generating enough torque for the synchronous operation. Note that, the switch SW1 is switched after the switches SW4 and SW5 are turned off so as not to short the switches SW1–SW5.

When the power swing is occurred due to changing load, etc., the microcomputer 22 transfers to the start operation after the rotational speed of the permanent magnet rotor 5 is made slower than prescribed speed, then transfers to the synchronous operation again. For example, in the case of the two-pole synchronous motor driven by the power source of 60 Hz, a threshold value of the rotational speed of the permanent magnet rotor 5 for transition from the start operation to the synchronous operation is 3,550 rpm, and a threshold value of the rotational speed of the permanent magnet rotor 5 for retransition to the start operation, which is occurred by the power swing, is 3,200 rpm; the motor can be stably rotated by repeatedly controlling the operational states. The threshold values for changing the operational states may be defined on the basis of output power, use, size, etc. of the motor.

In the two-pole synchronous motor of the present embodiment, since the transition from the start operation to the synchronous operation is controlled by the microcomputer, the two-pole synchronous motor can be used without changing specification even if the power source frequency is changed to 50 Hz, 60 Hz, 100 MHz, etc., so the wide-usable synchronous motor can be provided.

Another means for making the current intensity of the rectified current in the A-coil greater than that in the B-coil and converging the rectified current to the A-coil will be explained. For example, one combination of the switching means for the plus side and the minus side, which are connected to the B-coil, may be omitted. Namely, in FIG. 9, the switch SW4 and the third FET 35, or the switch SW5 and the fourth FET 36 may be omitted.

With this structure, the start operation circuit 14, which is switching-controlled during the start operation, can be simplified and easily controlled, number of the parts and manufacturing cost can be reduced, and size of the motor can be smaller.

Figure 12:
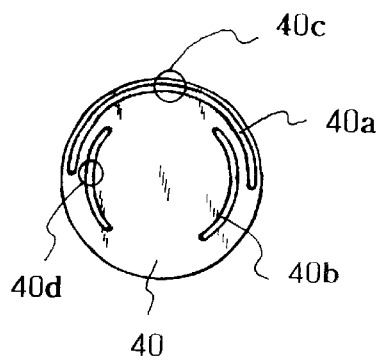
FIG. 12 is an explanation view of a sensor plate of an optical sensor.

Further, in FIG. 12, a sensor plate 40 has slits 40a and 40b, which define the current direction and the current application range of the current flowing through the A-coil and the B-coil, and the slits 40a and 40b may be detected by the optical sensor 12 (see FIG. 9). For example, the long arc slit 40a defines the current direction to the A-coil and the B-coil; the short arc slits 40b define the current application range of the B-coil (note that, in FIG. 12, a symbol 40c indicates the sensor position for detecting the slit 26a; a symbol 40d indicates the sensor position for detecting the slit 40b).

During the start operation, the microcomputer 22 may turn on/off the switches SW2–SW5 of the start operation circuit 14, on the basis of the detection signals of the optical sensor 12, which are outputted when the slits 40a and 40b of the sensor plate 40 are detected, so as to make the current intensity of the rectified current in the A-coil greater than that in the B-coil. In this case, the current application angular range is defined by the sensor plate 40, so that complex switching-control can be omitted and the microcomputer 22 can control easily.

In the two-pole synchronous motor of the present embodiment, the microcomputer 22 alternately changes the current direction of the rectified current flowing through the coils 9, turns on/off the third and the fourth FETs 35 and 36 so as to make the current application angular range, in which the current is applied to the coils 9 during one turn of the permanent magnet rotor 5, of the A-coil greater than that of the B-coil and converge the rectified current to the A-coil during the start operation by the start operation circuit 14. When the rotational speed of the permanent magnet rotor 5 reaches near the synchronous speed, the switch SW1 is switched to connect to the synchronous operation circuit 21, so that the motor can be securely and smoothly transferred from the start operation to the synchronous operation. Since no commutator and brushes are provided in the start operation circuit 14, spark can be prevented when the current direction is changed during the start operation, so that the safe and reliable synchronous motor can be realized. Unlike the conventional motor, no commutator and brushes are required and the switching means can be simplified, so the size of the motor can be smaller and manufacturing cost can be reduced.

When the power swing occurs, the microcomputer 22 once transfers from the synchronous operation to the start operation, then retranfers to the synchronous operation, so that the safe and reliable synchronous motor can be realized.

The stator core 8 includes the main core sections 8a, from each of which the subcore section 8b is extended in the direction opposite to the rotational direction of the permanent magnet rotor 5, and magnetic permeability of the main core sections 8a is greater than that of the subcore sections 8b so as to omit starting dead points of the permanent magnet rotor 5 and make the rotational direction thereof stable.

Unlike the two-pole and three-slot type motor in which an armature coils are accommodated in a slot, a space for winding coils 9 of the stator core 8 can be broader, so that number of turns of the coils 9 can be increased and the output efficiency of the motor can be made higher.

[Third Embodiment]

Figure 14:
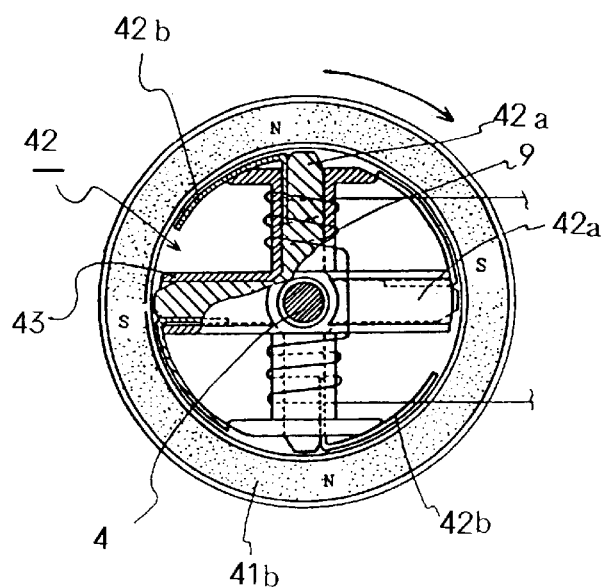
FIG. 14 is a transverse sectional view of the four-pole synchronous motor.
Figure 13:
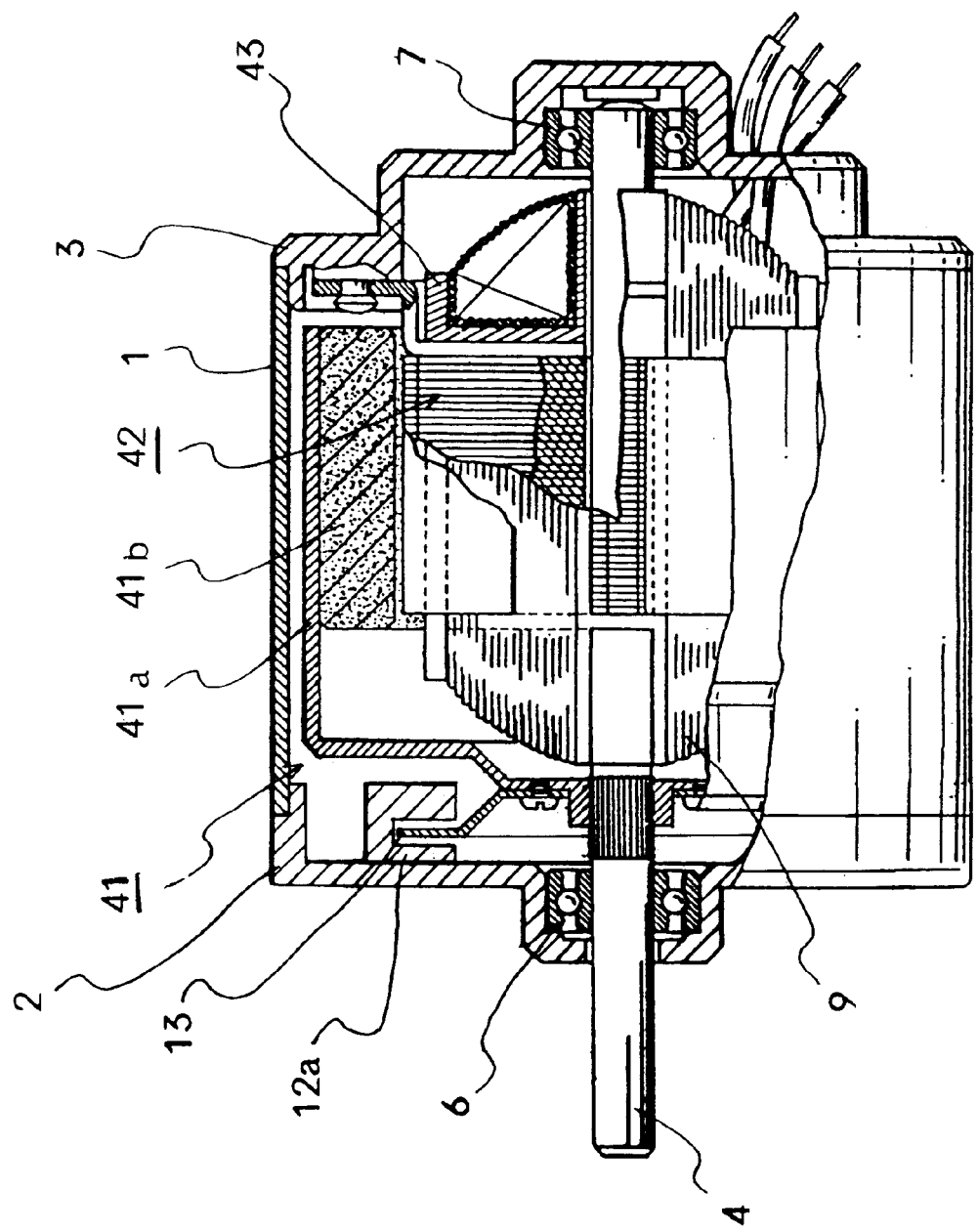
FIG. 13 is an explanation view of a four-pole synchronous motor of a third embodiment.

The synchronous motor of the present invention is not limited to the two-pole synchronous motor, and it can be applied to a four-pole synchronous motor shown in FIGS. 13 and 14. Note that, the elements explained in the first embodiment are assigned the same symbols and explanation will be omitted.

In FIG. 13, a permanent magnet rotor 41 includes a rotor yoke 41a and a ring magnet 41b, which is held on an inner face of the rotor yoke and in which four poles N and S are alternately provided with angular separations of 90°.

In FIG. 14, a stator core 42 of the four-pole synchronous motor has a main core section (a piled core section) 42a, which is formed into a cross-shape, and subcore sections 42b, each of which is extended from each end of the main core section in the opposite direction of the rotational direction of the permanent magnet rotor 41, so that starting dead points of the permanent magnet rotor 41 can be removed. The stator core 42 is fitted to and integrated with a bobbin 43, and the A- and B-coils of the coils 9 are formed in the bobbin 43 and on the both sides of the output shaft 4, wound round the bobbin 43 in the opposite directions and correspond to the four pole structure.

Figure 15:
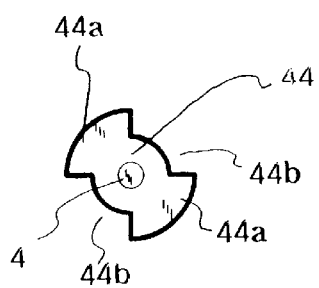
FIG. 15 is an explanation view of a rotary plate of the optical sensor of the four-pole synchronous motor.

As shown in FIG. 15, a rotary plate 44 has shading sections 44a and light passing sections 44b, which correspond to the pole positions of the magnet 41b with angular separations of 90°. The rotary plate 44 is integrated with the permanent magnet rotor 41 and can be rotated together with the rotor about the output shaft 4. The optical sensor 12 detects the rotational speed and the pole positions of the permanent magnet rotor 5 by the rotary plate 44. In the four-pole synchronous motor, the magnetic poles of the coils 9 are changed every 90° turn of the permanent magnet rotor 5, thus the current direction of the coils 9 must be changed every 90° turn of the permanent magnet rotor 41 during the start operation.

The two-pole and the four-pole synchronous motors of the present embodiment are outer-rotor type motors, but the present invention may be applied to inner-rotor type motors.

[Fourth Embodiment]

Figure 16A:
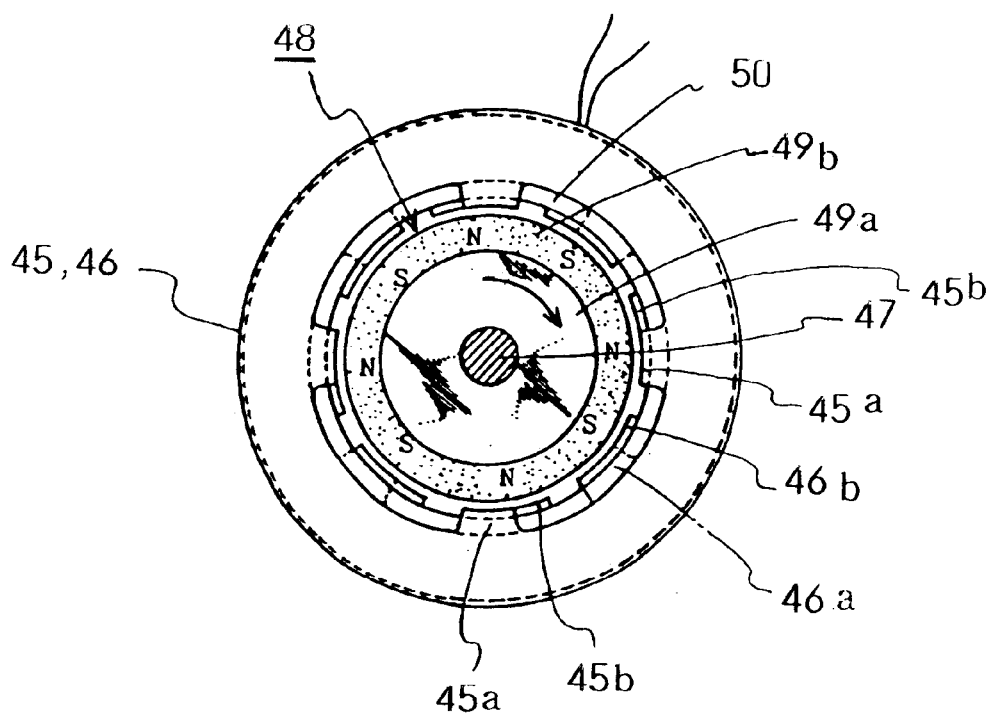
FIG. 16A is a transverse sectional view of the permanent magnet rotor of a eight-pole synchronous motor of a fourth embodiment.
Figure 16B:
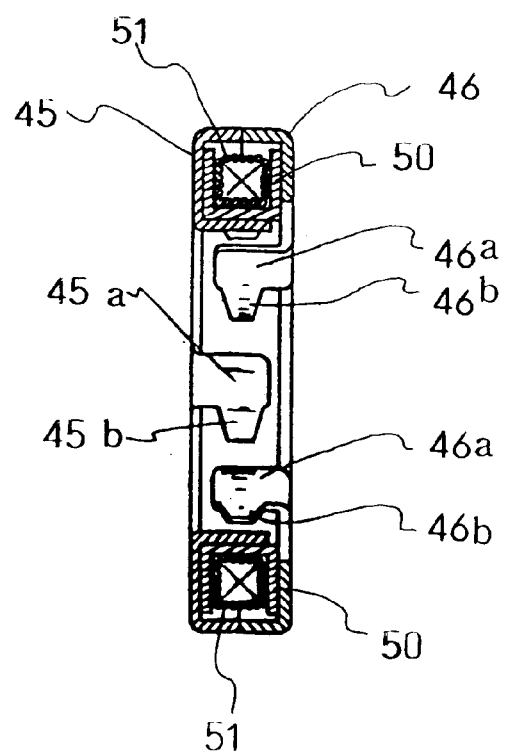
FIG. 16B is an explanation view of the stator, from which the rotor is detached.
Figure 17:
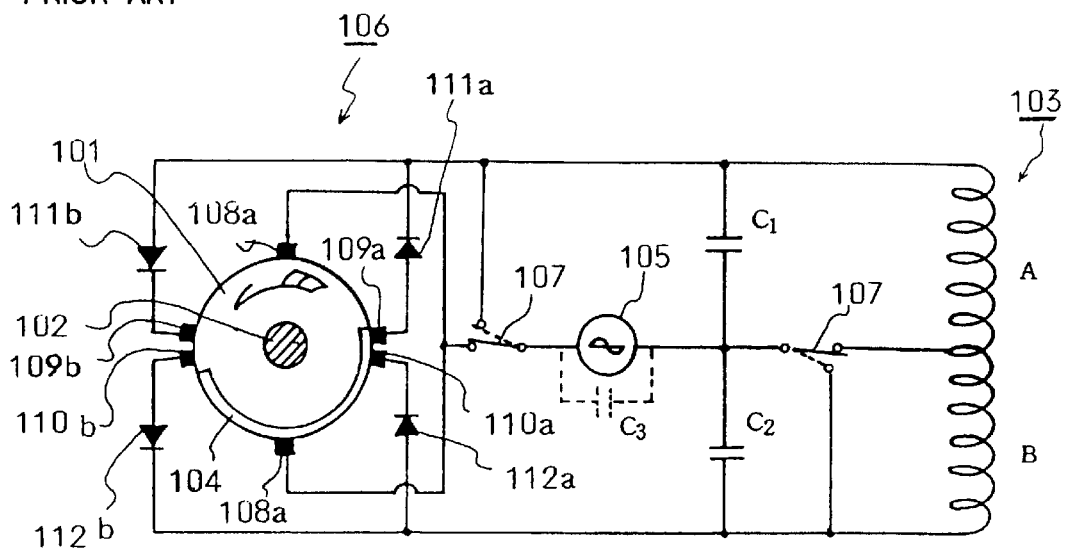
FIG. 17 is an explanation view of an example of a prior art outer rotor-type two-magnetic pole synchronous motor.
Figure 18:
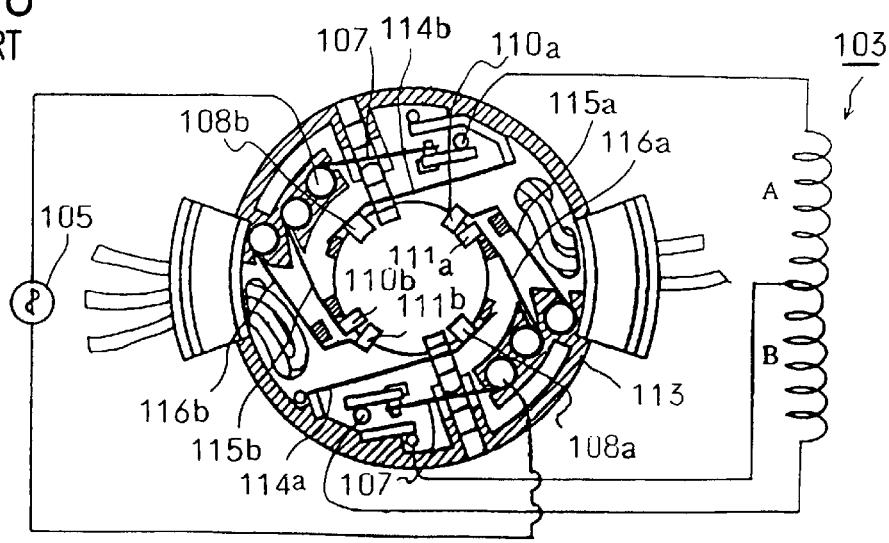
FIG. 18 is a transverse sectional view of the motor of FIG. 17.

Next, an inner-rotor type eight-pole synchronous motor will be explained with reference to FIGS. 16A and 16B. FIG. 16A is a longitudinal sectional view of a permanent magnet rotor; FIG. 16B is an explanation view of a stator from which the permanent magnet rotor has been detached.

Symbols 45 and 46 stand for stator yokes, which can be separated and which also act as a housing accommodating the stator and the permanent magnet rotor (see FIG. 16B). The permanent magnet rotor 48 is accommodated in the stator yokes 45 and 46 and capable of rotating about an output shaft 47. The output shaft 47 is rotatably held by bearings, not shown, in the stator yokes 45 and 46 (see FIG. 16A).

In FIG. 16A, the permanent magnet rotor 48 includes a magnet holder 49a, which is fitted to the output shaft 47, and a ring magnet 49b, which covers the magnet holder and is fixed thereto and in which the N- and S-poles are alternately provided with 45°. The permanent magnet rotor 48 is rotated about the output shaft 47 by repulsion force, which is generated between the magnetic poles of the rotor and the coils.

A bobbin 50 is provided outside of the permanent magnet rotor 48 and inside of the stator yokes 45 and 46 (see FIG. 16B), and the coils 51, which are the A- and B-coils, is wound round the bobbin 50 (see FIG. 16B).

As shown in FIG. 16B, eight main core sections 45a and 46a, which are formed by bending the stator yokes 45 and 46 in the axial direction, are alternately arranged in the circumferential direction of the stator yokes. Further, subcore sections 45b and 46b are respectively extended, in the opposite direction of the rotational direction of the permanent magnet rotor 48, from the main core sections 45a and 46a, so that starting dead points can be removed.

An optical sensor (not shown), which acts as the first measuring means for measuring the rotational speed and the pole positions of the permanent magnet rotor 48, is provided in the stator yokes 45 and 46. The optical sensor measures the rotational speed of the permanent magnet rotor 48 with a rotary plate (not shown), which is fixed to the output shaft 47, and a microcomputer, not shown, switching-controls the current direction and the current intensity of the rectified current flowing through the A-coil of the coils 51. In the synchronous motor of the present invention, the motor may be controlled by the microcomputer 22, which is assembled in the motor, or a control circuit (including an AC power source, a start operation circuit, a synchronous operation circuit, etc.) of an electric device, in which the synchronous motor is assembled.

The present invention can be applied to an inductor-type synchronous motor, a planar synchronous motor having a planar magnet and coils, etc. Fuses and heat detecting switched may be assembled in circuits for safety operation as well as conventional induction motors.

Modification of the present invention can be allowed without deviating the spirit of the invention, for example, the armature coils 9 are not limited to the A- and B-coils, so a single coil may be employed as the armature coil if efficiency of power consumption is not considered.

What is claimed is:

1. A synchronous motor comprising:

a housing;

a permanent magnet rotor rotatably attached in the housing and rotating about an output shaft;

a stator including coils wound round a stator core;

an A-coil segment and a B-coil segment, which are connected in series, included in said coils;

first measuring means for measuring rotational speed of said permanent magnet rotor and positions of magnetic poles thereof;

second measuring means for measuring frequency of an AC power source;

a start operation circuit rectifying alternate current, which is supplied from the AC power source, with a rectifying bridge circuit and changing the direction of the rectified current, which flows through the A-coil of said coils, according to rotational angle of said permanent magnet rotor by controlling switching means so as to start said permanent magnet rotor as a DC brushless motor;

a synchronous operation circuit shorting the AC power source and the A- and the B-coils so as to synchronously rotate said permanent magnet rotor as an AC synchronous motor;

switches SW1 and SW2 being provided between the AC power source and the coils and switching the connection to said synchronous operation circuit; and control means turning off said switches SW1 and SW2 to disconnect said synchronous operation circuit and controlling said switching means during the start operation, starting with suppressing input of the inverted minus side of the AC power source, which is full-wave-rectified and flows through the A-coil of the coils via the rectifying bridge circuit, so as to make the current application range of the minus side shorter than that of the plus side, turning off said switching means and turning on said switches SW1 and SW2 when the rotational speed of said permanent magnet rotor, which is measured by said first measuring means, reaches near synchronous speed with respect to the frequency of the power source, which is measured by said second measuring means, thereby said start operation circuit using the A-coil is disconnected and said synchronous operation circuit using the A- and B-coils is connected to transfer to the synchronous operation.

2. The synchronous motor according to claim 1, wherein said control means controls said switching means for a predetermined time, during the start operation, so as to control the current application range of the inverted minus side of the rectified current, which is supplied from the AC power source and full-wave-rectified, flowing through the A-coil.

3. The synchronous motor according to claim 1, further comprising third measuring means including: a sensor plate having slits, which are formed in a circumferential direction so as to introduce the current toward the coils; and an optical sensor detecting the slits, wherein said control means controls said switching means and switching-controls the current direction toward the A-coil of the coils, during the start operation, on the basis of output signals of the optical sensor.

4. The synchronous motor according to claim 3, wherein said third measuring means including: a sensor plate having slits, which are formed in the circumferential direction so as to make the current application range of the inverted minus side of the rectified current, which is supplied from the AC power source and full-wave-rectified, flowing through the A-coil shorter; and an optical sensor for detecting the slits, and wherein said control means controls said switching means so as not to apply the current to the inverted minus side of the rectified current, within a prescribed angular range, on the basis of the output signals of the optical sensor.

5. The synchronous motor according to claim 1, wherein said first measuring means includes: a sensor plate having slits and shading sections, which are alternately formed and divide a portion between magnetic poles into odd number of parts; and an optical sensor detecting the slits and the shading sections, wherein said control means controls said switching means, detects the stop pole of said permanent magnet rotor on the basis of the output signals of said optical sensor, supplies the current to the A-coil to securely rotate said permanent magnet rotor in the normal direction during the start operation, switches the current direction toward the A-coil with measuring the rotational angle and the positions of the magnetic poles of said permanent magnet rotor, and apply no current to the inverted minus side of the rectified current within a prescribed angular range.

6. The synchronous motor according to claim 1, wherein said control means repeatedly controls said switches SW1 and SW2 so as to transfer from the synchronous operation to the start operation and transfer to the synchronous operation again when power swing occurs.

7. The synchronous motor according to claim 1, wherein the stator core includes main core sections, from each of which a subcore section extends in the opposite direction of the rotational direction of said permanent magnet rotor, and magnetic permeability of the main core section is greater than that of the subcore section.

8. The synchronous motor according to claim 1, wherein said stator has a bobbin, which is attached to the stator core and includes a core shaft, whose axial line is perpendicular to an axial line of said permanent magnet rotor, and flanges, which are respectively provided on the both ends of the core shaft, and said coils are serially wound around the bobbin.

9. A synchronous motor, comprising:

a permanent magnet rotor rotatably attached in a housing and rotating about an output shaft;

first measuring means for measuring rotational speed of said permanent magnet rotor and positions of magnetic poles thereof;

second measuring means for measuring frequency of an AC power source;

a stator including coils, which are an A-coil and a B-coil wound round a stator core and serially connected via an intermediate tap;

a start operation circuit being connected to the AC power source and the intermediate tap of the coils and further connected to the A-and B-coils in parallel with respect to the AC power source, wherein a first and a second diode for flowing the rectified current through the A-coil and a first and a second transistor, which can be switching-controlled so as to alternately changing the direction of the rectified current, are respectively connected in parallel, a third and a fourth diode for flowing the rectified current through the B-coil and a third and a fourth transistor, which can be switching-controlled so as to alternately changing the direction of the rectified current, are respectively connected in parallel, the AC current of the AC power source is rectified by a first to a fourth diode, and the first to the fourth transistors are switching-controlled so as to alternately flow the rectified current through the A-coil and the B-coil according to the rotational angle of the permanent magnet rotor and start said permanent magnet rotor as a DC brushless motor;

a synchronous operation circuit being connected to the AC power source and the B-coil so as to synchronously rotate said permanent magnet rotor as an AC synchronous motor;

a switch SW1 switching the connection between said start operation circuit, to which the AC power source and the intermediate tap are connected, and said synchronous operation circuit, to which the AC power source and the B-coil are connected; and control means alternately changing the current direction of the rectified current flowing through the coils, turning on/off the third and the fourth transistors of said start operation circuit so as to make a current application angular range, in which the current flows to the coils during one turn of said permanent magnet rotor, of the A-coil greater than that of the B-coil and converge the rectified current to the A-coil during the start operation, turning off the third and fourth transistors, which are connected to the B-coil, and turning on the first and second transistors, which are connected to the A-coil when the rotational speed of said permanent magnet rotor, which is measured by said first measuring means, reaches near synchronous speed with respect to the frequency of the power source, which is measured by said second measuring means, and controlling said switch SW1 to change the connection from the intermediate tap to the B-coil so as to transfer the synchronous operation by said synchronous operation circuit.

10. The synchronous motor according to claim 9, wherein one combination of the third and fourth diodes and the third and fourth transistors, which are respectively connected in parallel, of said start operation circuit is omitted so as to make current intensity of the A-coil greater than that of the B-coil during the start operation.

11. The synchronous motor according to claim 9, wherein said first measuring means includes a sensor plate having slits, which define directions and application range of the current flowing through the A-coil and the B-coil, wherein said first measuring means detects the slits, said control means switching-controls the first to the fourth transistors of said start operation circuit so as to make current intensity of the A-coil greater than that of the B-coil, during the start operation, on the basis of output signals of said first measuring means.

12. The synchronous motor according to claim 9, wherein said control means repeatedly controls said switch SW1 so as to transfer from the synchronous operation to the start operation and transfer to the synchronous operation again when power swing occurs.

13. The synchronous motor according to claim 9, wherein the stator core includes main core sections, from each of which a subcore section extends in the opposite direction of the rotational direction of said permanent magnet rotor, and magnetic permeability of the main core section is greater than that of the subcore section.

14. The synchronous motor according to claim 9, wherein said stator has a bobbin, which is attached to the stator core and includes a core shaft, whose axial line is perpendicular to an axial line of said permanent magnet rotor, and flanges, which are respectively provided on the both ends of the core shaft, and the A-coil and the B-coil are serially wound around the bobbin.

* * * * *